(12) United States Patent
Samineni

(10) Patent No.: US 11,526,588 B2
(45) Date of Patent: Dec. 13, 2022

(54) SYSTEMS AND METHODS FOR DIGITAL CONTENT ANTI-COUNTERFEITING

(71) Applicant: WhatsApp Inc., Menlo Park, CA (US)

(72) Inventor: Naga Rohit Samineni, Mountain View, CA (US)

(73) Assignee: WhatsApp LLC, Menlo Park, CA (US)

( * ) Notice: Subject to any disclaimer, the term of this patent is extended or adjusted under 35 U.S.C. 154(b) by 19 days.

(21) Appl. No.: 16/996,163

(22) Filed: Aug. 18, 2020

(65) Prior Publication Data

US 2022/0058247 A1 Feb. 24, 2022

(51) Int. Cl.
| | |
|---|---|
| G06F 3/048 | (2013.01) |
| G06F 21/31 | (2013.01) |
| G06F 3/04845 | (2022.01) |
| G06F 21/62 | (2013.01) |
| G06F 3/0346 | (2013.01) |
| G06F 3/0354 | (2013.01) |
| G06F 3/0489 | (2022.01) |
| G06F 3/16 | (2006.01) |

(52) U.S. Cl.
CPC .......... *G06F 21/31* (2013.01); *G06F 3/04845* (2013.01); *G06F 21/6218* (2013.01); *G06F 3/0346* (2013.01); *G06F 3/03543* (2013.01); *G06F 3/0489* (2013.01); *G06F 3/167* (2013.01)

(58) Field of Classification Search
CPC .... G06F 3/167; G06F 3/03543; G06F 3/0346; G06F 3/0489; G06F 3/04845; G06F 21/6218; G06F 21/31
See application file for complete search history.

(56) References Cited

U.S. PATENT DOCUMENTS

| | | | |
|---|---|---|---|
| 10,269,017 B1* | 4/2019 | Phillips | H04L 63/0492 |
| 2010/0306819 A1 | 12/2010 | Nahari et al. | |
| 2016/0044025 A1* | 2/2016 | Goyal | G06F 21/36 |
| | | | 726/6 |
| 2016/0241556 A1 | 8/2016 | Jakobsson | |
| 2018/0336543 A1* | 11/2018 | Van Os | G06Q 20/322 |

FOREIGN PATENT DOCUMENTS

WO 2017021896 A1 2/2017

OTHER PUBLICATIONS

International Search Report and Written Opinion for International Application No. PCT/US2021/044082, dated Nov. 12, 2021, 13 pages.

* cited by examiner

*Primary Examiner* — Rashawn N Tillery
(74) *Attorney, Agent, or Firm* — McDermott Will & Emery LLP

(57) ABSTRACT

Exemplary embodiments relate to techniques for asserting the authenticity of digital content being communicated among client devices of a communication or computer system by configuring the digital content with one or more sensor responsive elements. The sensor responsive element may be a visual interface that dynamically reacts or responds to sensor data generated by one or more sensors (such as a gyroscope sensor, a microphone, and a camera) of a receiving client device. If the sensor responsive element does not dynamically react or respond to movement data, image data, or sound data generated by the one or more sensors, the digital content may fail user inspection and may indicate to the recipient that the digital content is a fake or a counterfeit.

20 Claims, 15 Drawing Sheets

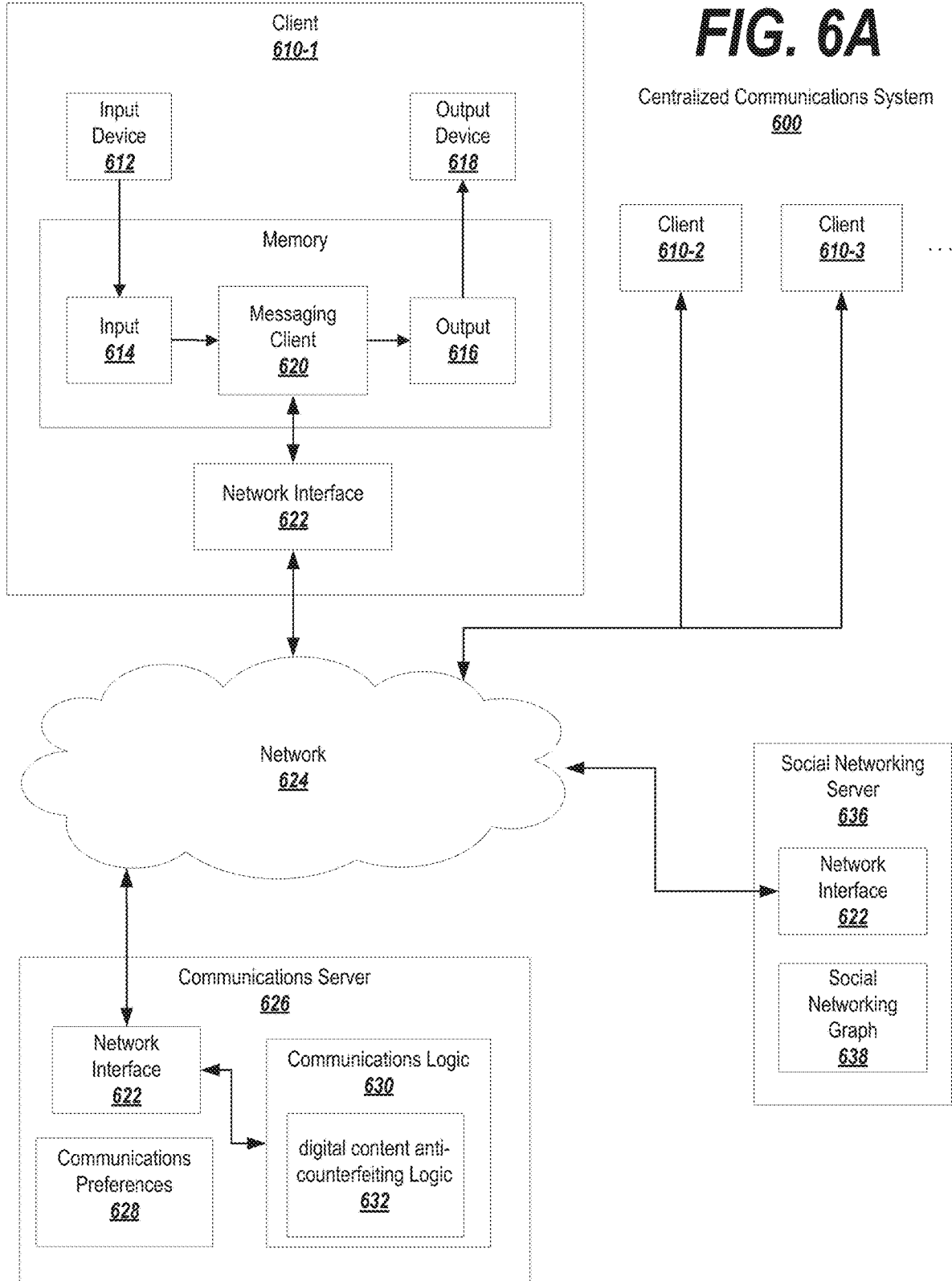

Distributed Communications System 650

SYSTEMS AND METHODS FOR DIGITAL CONTENT ANTI-COUNTERFEITING

BACKGROUND

Digital content may be counterfeited by malicious actors or fraudsters. Often times, digital messages may be counterfeited to make the messages look like they were legitimately sent by or originated from senders in order to trick recipients of those messages into performing a specific act. In other examples, digital confirmations or receipts may be counterfeited with illegitimate images, stickers, text, etc. to fake purchases or otherwise imitate completed transactions.

BRIEF DESCRIPTION OF THE DRAWINGS

FIG. 6A depicts an exemplary centralized communications service.

DETAILED DESCRIPTION

Figure 1:
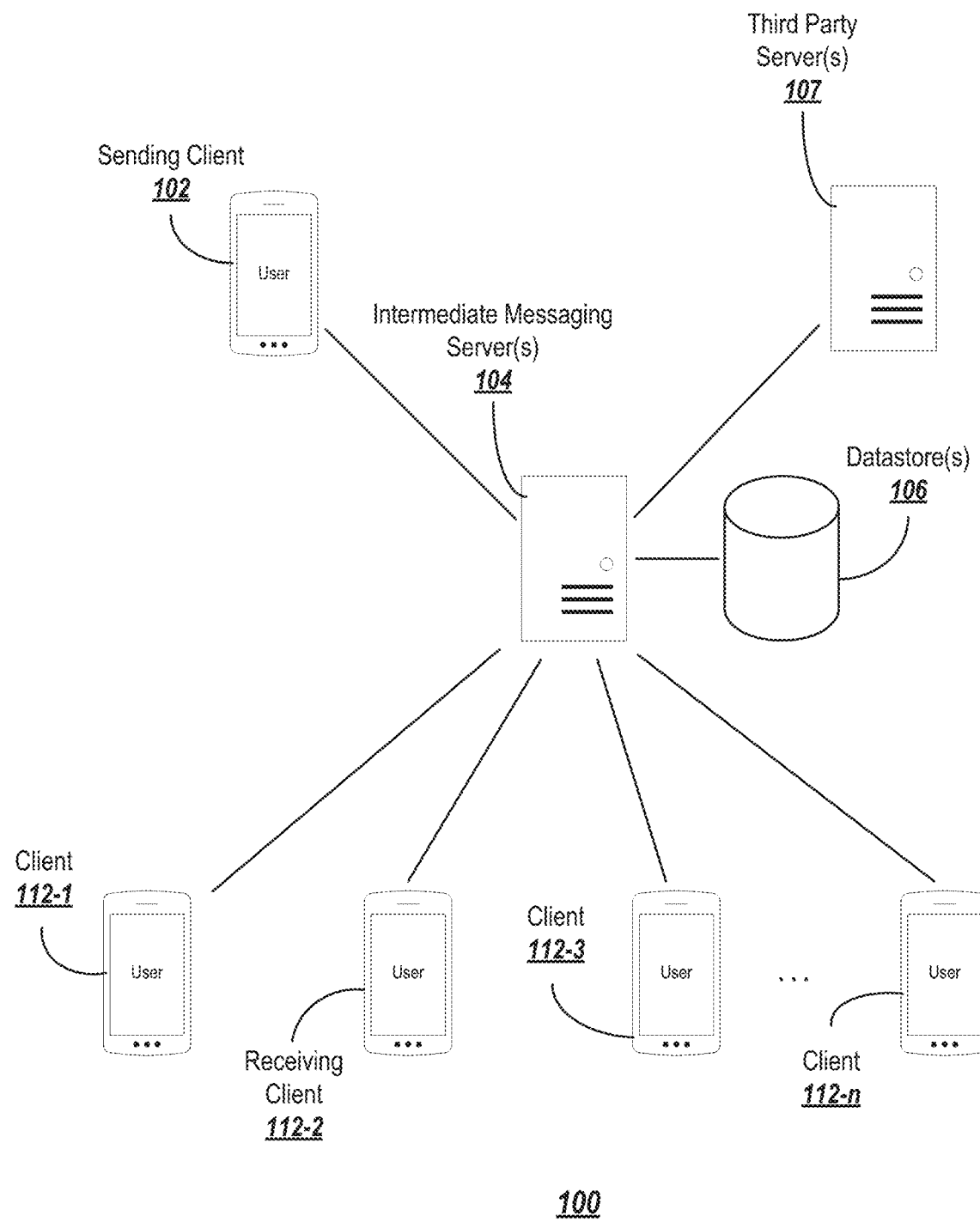
FIG. 1 depicts an exemplary communication or computer system.

Exemplary embodiments are directed to techniques for asserting the authenticity of digital content by embedding, attaching or otherwise configuring the digital content with one or more sensor responsive elements. As will be further described in detail below, a sensor responsive element may be a visual interface that dynamically responds to sensor data generated by sensors of a computing device. For example, the sensor responsive element may be a gyroscope-sensitive interface, such as a virtual holographic film, that sparkles or sheens and changes color as the computing device is moved or tilted at different viewing angles. In another example, the sensor responsive element may be virtual "inclinometer," which may show a first shape moving around relative to or within a second shape in accordance with movement data provided by a gyroscope sensor. In other examples, the sensor responsive element may be a visual interface that changes shape and/or color as a microphone detects speech or voice frequency data. In yet further examples, the visual interface of the sensor responsive element can be animated based on the sensor data.

According to embodiments, one or more backend messaging servers of a messaging platform or a computer system may directly generate digital content and configure the digital content with the one or more sensor responsive elements. In examples, the messaging server(s) may communicate with one or more third party servers to coordinate and perform transactions between at least two end users of the messaging platform. Upon receiving indication from the one or more third party servers that the transaction has been completed, the backend messaging servers may generate transaction confirmations (e.g., the digital content) for the transacting users and configure these confirmations with a respective sensor responsive element to assert or ensure authenticity.

According to further embodiments, if the digital content originates from a source other than the one or more backend messaging servers, the server(s) may determine whether that source can be trusted (e.g., whether the source is an authenticated or verified source). If the source can be trusted, the one or more backend messaging servers may configure the digital content with a sensor responsive element and then send the digital content to the intended recipients. If the source cannot be trusted, the backend messaging servers may implement various techniques to determine the trustworthiness of the source and, based on this determination, configure the digital content with the sensor responsive element.

The source of the digital content, for example, may be an internal source (e.g., an authenticated user of a messaging platform) or may be an external source (e.g., an unauthorized or unverified device associated with an external communication system). In examples, the external source may be a user or component of another messaging platform, and users on either end of the messaging platforms may have a relationship to each other, such as the users being included in each other's contact list, having previous communication history, having shared contacts, etc. In at least that regard, even though a user on the other messaging platform is considered to be an external source, the cross-platform nature of the two messaging systems may allow for quick and easy authentication or verification of that user for at least digital content anti-counterfeiting purposes. In some instances, a cross-platform user may be automatically considered an authenticated or verified user.

The term "digital content" used herein may broadly refer to any content that exists in the form of storable digital data, such as digital messages, digital images, video, video games, electronic confirmations, digital receipts, digital tickets, web pages, websites, social networking or media content, electronic documents, electronic books, an augmented reality (AR) content, a virtual reality (VR) content, etc.

The exemplary embodiments presented and described herein are advantageous in numerous ways. For example, sensor responsive elements provide a highly secure and efficient way of checking the authenticity of digital content. Because malicious actors do not have access to sensor data generated by sensor(s) of client devices connected to the messaging platform, faked or counterfeited content with a faked or counterfeited sensor responsive element would not behave or react as it should, and thus, would quickly fail user inspection. Another advantage is that the sensor responsive elements are highly customizable at least aesthetically and functionally, as will be further described in detail below.

A Note on Data Privacy

The above brief summary is intended to serve as a non-limiting introduction to the concepts discussed in more detail below. However, before discussing further exemplary embodiments, a brief note on data privacy is first provided. A more detailed description of digital content anti-counterfeiting techniques will be addressed in connection with the following Figures.

Some embodiments described herein make use of data or metrics that may include information voluntarily provided by one or more users. In such embodiments, data privacy may be protected in a number of ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Assuming a user's privacy conditions are met, exemplary embodiments may be deployed in a wide variety of messaging systems, including messaging in a social network or on a mobile device (e.g., through a messaging client application or via short message service), among other possibilities. An overview of exemplary logic and processes for engaging in synchronous video conversation in a messaging system is next provided.

As an aid to understanding, a series of examples will first be presented before detailed descriptions of the underlying implementations are described. It is noted that these examples are intended to be illustrative only and that the present invention is not limited to the embodiments shown.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, well known structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 122 illustrated as components 122-1 through 122-a may include components 122-1, 122-2, 122-3, 122-4, and 122-5. The embodiments are not limited in this context.

Exemplary System

FIG. 1 depicts an exemplary communication or computer system 100 according to one or more embodiments. The communication or computer system 100 may be part of or implemented in a messaging platform (e.g., social networking platform, social media platform, standalone messaging platform, etc.). The system 100 may include at least a sending client device 102, one or more intermediate messaging servers 104, one or more data stores 106 coupled to the messaging server(s) 104, and client devices 112 including one or more receiving client devices 112-2. Moreover, one or more components, such as the intermediate messaging servers 104, may be connected to or in communication with (persistently or selectively) one or more third party servers 107 (and/or any related components thereof).

The sending client device 102 and the receiving client devices 112-2 may communicate with each other via the intermediate messaging server(s) 104. It may be understood that the intermediate messaging servers 104 may be backend servers of the messaging platform and may run, support, or execute the digital content anti-counterfeiting functionalities described herein. A sending user (e.g., first user) may be associated with and operate the sending client device 102. Each of the client devices 112 may be associated with or belong to different users on the messaging platform (e.g., second user, third user, fourth user, fifth user). Although a mobile device, such as a smartphone, is shown in FIG. 1 as being the sending and receiving client devices, it may be understood that any computing device (e.g., stationary desktop computers, server computers, wearable computing devices, tablet devices, virtual reality devices, etc.) can also be the sending and receiving devices within the messaging platform.

According to one or more embodiments, the messaging platform may facilitate the communication of digital content among client devices in various ways. As will be further described in detail below, the digital content may be directly generated by the one or more intermediate messaging servers 104, which may then configure the digital content with one or more sensor responsive elements before sending the generated digital content to the intended recipients. In other examples, the digital content may be generated, and thus originate, from an authorized user of the messaging platform and not the one or more intermediate messaging servers 104. In yet other examples, the digital content may originate from unauthorized users outside or external to the messaging platform, such as external third-party messaging networks (e.g., email, SMS, etc.) or the like.

In examples where the digital content is generated by a source other than the one or more intermediate messaging servers 104, the server(s) 104 may determine whether that source can be trusted. If the source of the digital content is an authorized user of the messaging platform, it may be assumed that the user can be trusted. If the source of the content is a cross-platform user, a quick verification may be performed (based on the cross-platform nature of the connected messaging platforms) and, based on the verification, the cross-platform can be trusted. In some examples, it can be assumed that the cross-platform user can be trusted. If the source is an unauthorized user or an unauthorized entity, additional verification may be performed to ensure that the digital content can be trusted.

Moreover, the communication system 100 may be configured to communicate with other communication systems, which may, according to examples, form a cross-platform messaging system. While the exemplary system illustrated in FIG. 1 and the features thereof were described for a messaging platform, it may not be limited thereto and may broadly include other types of systems, such as a computer system, for at least configuring digital content with sensor responsive element(s). Thus, it may be understood the embodiments and examples described in further detail below may be implemented via the other types of systems, such as the computer system.

Exemplary Digital Content Generation and Sensor Responsive Element Configuring

Figure 2:
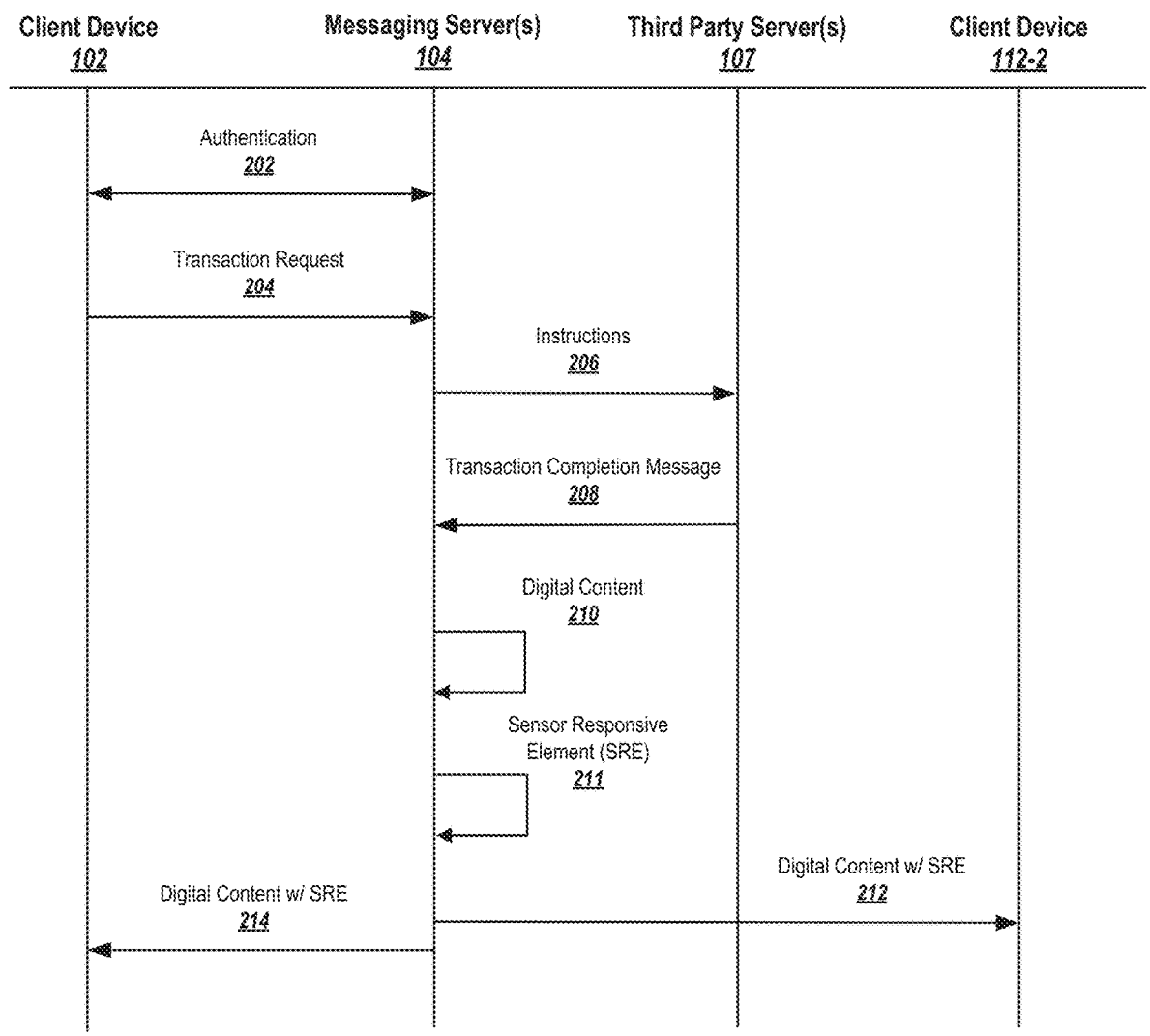
FIG. 2 depicts a first exemplary data flow diagram.

FIG. 2 depicts an exemplary data flow diagram 200 according to one or more embodiments. For ease of explanation, the system 100 of FIG. 1 and components thereof will be used to describe the exemplary data flow diagram 200. The data flow diagram 200 shows the communicative interaction among at least the sending client device 102, the one or more intermediate messaging servers 104, the one or more third party servers 107, and the receiving client device 112-2. As described above, digital content may be directly generated by the one or more backend messaging servers.

In one example, a first user, via sending client device 102, may initiate a cash payment or cash transfer of a specified amount (e.g., $50.00) and identify a second user (e.g., receiving client device 112-2) as the intended recipient. Before the transaction can be performed, the messaging servers 104 may authenticate the first user via authentication process 202 so as to at least ensure that the first user is an authenticated and verified user of the messaging platform and is actually who the user purports to be.

For instance, authentication process 202 may involve at least the first user entering or inputting one or more different types of credentials, such as a one-time PIN (OTP) code, login ID and password, biometric information (e.g., fingerprint scan), etc. User authentication may be required to log in to the messaging platform, or in other instances, user authentication may be required for specific types of transactions, such as cash payment or transfers. In yet other instances, the first user may be automatically accepted as a verified user after having successfully logging in to the user's messaging platform account in the first instance.

After successful authentication of the first user, sending client device 102 may send a transaction request 204 to the intermediate messaging server(s) 104. The transaction request 204 may include at least the basic information necessary to complete the transaction, such as information related to the parties involved in the transaction, the monetary amount being paid or moved, currency-related information, date and/or time of transaction, etc. The information may then be packaged into one or more instructions 206 and sent to the one or more third party servers 107 for further processing. In examples, the one or more third party servers 107 may be banking servers involved in carrying out the requested transaction between the banking accounts associated with the first and second users.

After the funds have been transferred, the one or more third party servers 107 may send a transaction completion message 208 to the intermediate messaging servers 104. The completion message 208 may indicate that the fund have been successfully transferred from the first user's banking account to the second user's banking account. The intermediate messaging server(s) 104 may then directly generate the digital content 210, e.g., at least two digital receipts or transaction confirmations, for each of the first and second users.

The digital confirmation may be in the form of a message (e.g., text, SMS, e-mail, etc.) indicating that the transaction had been successfully completed and may further include one or more details related to the transaction, such as amount paid or transferred. Because the source of the digital content is the one or more intermediate messaging servers 104 itself, the server(s) 104 may automatically determine and/or acknowledge that that source of the digital content is an authenticated or verified source. As will be further described below, digital content may be generated or sent from sources other than the server(s) 104, which requires, in examples, the server(s) 104 to authenticate or verify the source of the digital content and, if applicable, configuring the digital content with a sensor responsive element prior to distributing, sending or forwarding the content to the intended recipient client device(s).

The intermediate messaging server(s) 104 may then generate or provide a sensor responsive element ("SRE") 211 and configure each of the digital receipts or confirmations with a respective SRE 211. According to embodiments, the sensor responsive element may be a program or include executable code or any other suitable computer code elements or languages (e.g., HTML) that can be executed or processed by one or more receiving client devices (e.g., via the messaging interface of the messaging platform). For at least purposes of record keeping and security, an identifier (e.g., alphanumeric string, ID number, encrypted ID, token, tag, a block of blockchain) may be assigned or associated to a generated sensor responsive element such that it can be traced back to a specific creator (e.g., specific backend server) and a specific date/time of creation. Moreover, a similar but different identifier may be used to assign, associate, or link the generated sensor responsive element to the digital content it is configured with or embedded in.

It may be understood that only authorized backend system components, such as the intermediate messaging servers 104, can generate or configure the various features of the sensor responsive elements and/or attach, embed, configure, include, etc. the sensor responsive elements to digital content. Further, it may be understood that only the authorized backend system components may have access to the various sensor data of each authorized client device on the messaging platform. Advantageously, in at least that regard, malicious actors or fraudsters do not have access to at least two important features of the sensor responsive element for counterfeiting the elements: the customizable, look, or uniqueness of the elements and the sensor data generated by the client device sensors for the elements to dynamically react or respond sensor data.

Thereafter, the one or more intermediate messaging servers 104 may send the digital content (e.g., the transaction confirmation) along with the configured SRE to the receiving client device 112-2. Similarly, the digital content with the SRE may be sent to the sending client device 102. Moreover, the messaging platform may update each of the users' respective messaging platform accounts and corresponding interfaces to reflect the completed transaction.

It may be understood that, in some examples, sending a confirmation to the sending client device 102 may be optional since it may be more important for the second user—the recipient of the cash payment—to inspect that the digital confirmation is not a counterfeit. Moreover, although FIG. 2 shows that the digital confirmations 212 and 214 are sent to the receiving and sending client devices in a time-staggered manner, it may be understood that the confirmations 212 and 214 can be sent simultaneously.

In further examples, the digital content generated by the intermediate messaging server(s) 104 in data flow diagram 200 may be a digital ticket (e.g., event ticket, musical concert ticket, festival ticket, transportation ticket, theme park ticket, passes, etc.) or any digital voucher indicating that a user is entitled to admission to an event, vehicle, transportation device, etc. In one example, an event holder (e.g., musical concert organizer) may want to allow users of the messaging platform to have authenticated digital copies of tickets available on client devices. The first user (e.g., the musical concert organizer) may perform authentication 202 with the intermediate messaging server(s) 104 similar to the authentication techniques described above.

The musical concert organizer may send transaction request 204 to the messaging server(s) 104 request generation of a digital ticket for the second user (e.g., concert goer). The one or more intermediate messaging servers 104 may then send instructions 206 to one or more third party servers 107, which may be server computers associated with the musical concert organizer or any other involved parties. The instructions 206 may request information verifying that the second user has indeed purchased a ticket and information on how to associate or link the ticket with the second user, such as ticket number, seat number, alphanumeric identifier, bar code, key, token, etc. The one or more third party servers 107 may provide this information in the transaction completion message 208. Thereafter, the messaging server(s) may generate the digital content 210 (e.g., the digital copy of the ticket) along with the sensor responsive element 211 configured to or embedded therein. The digital copy of the ticket with the configured sensor responsive element may be sent to the second user, and optionally, the same digital copy of the ticket may be sent to the concert organizer for at least record keeping purposes. In examples, the identifier linking the digital ticket and the generated sensor responsive element may be one or more portions of the ticket number or any related information.

In at least the above described examples, the one or more intermediate messaging servers 104 may be actively involved in generating both the digital content and the sensor responsive element and facilitating the communication thereof between various users of the messaging platform, which advantageously allows at least the backend messaging servers to oversee and control the anti-counterfeiting processes and increase overall communication system security.

Exemplary Sensor Responsive Elements

Figure 3A:
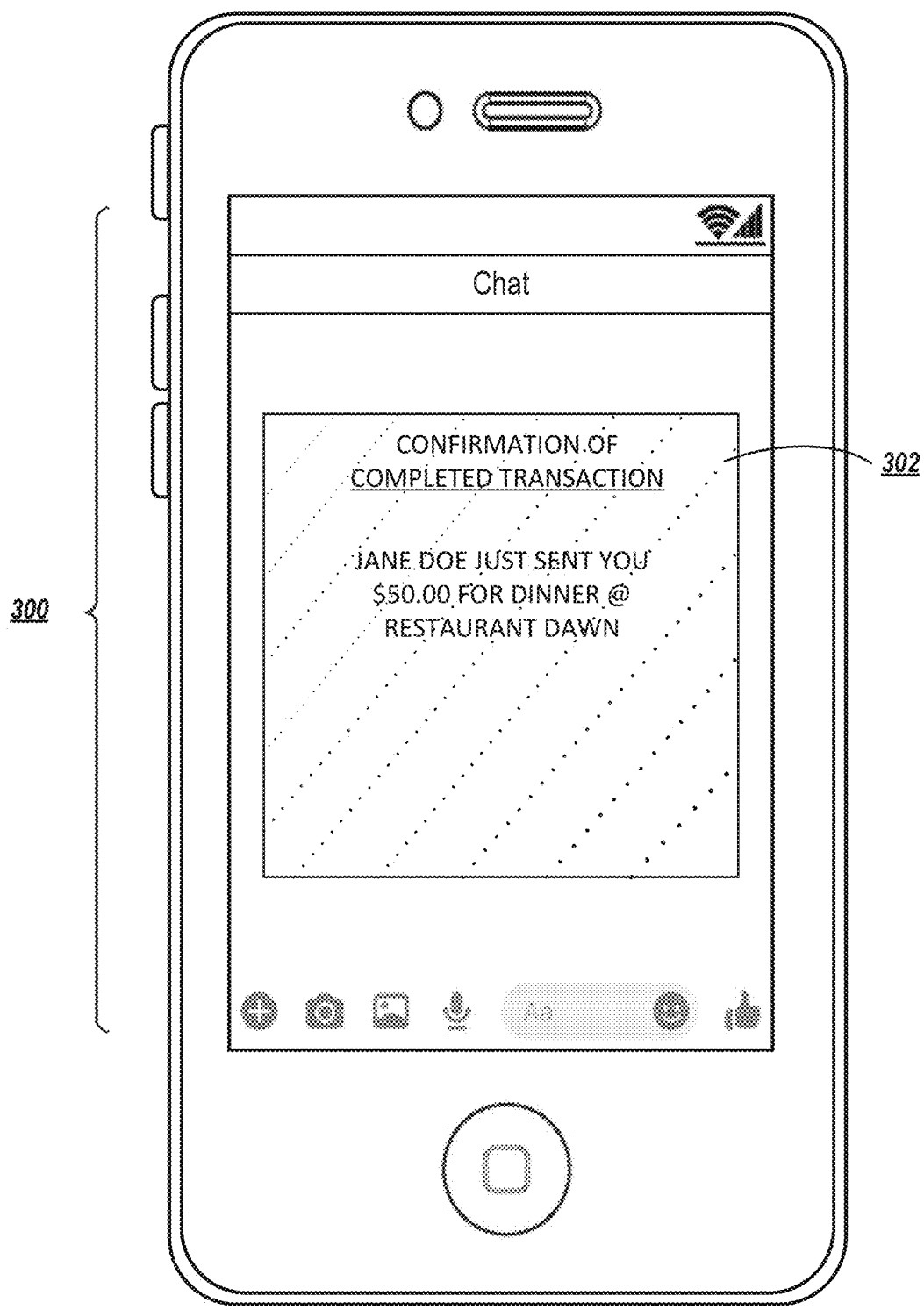
FIG. 3A depicts a first exemplary sensor responsive element.

FIG. 3A depicts an exemplary sensor responsive element 302 according to one or more embodiments. As described above, when a user of the messaging platform receives digital content via the platform, the content may be configured (embedded or attached) with a sensor responsive element and displayed on the second user's client device so that the user can visually inspect the authenticity of the received digital content. Referring to the above transaction confirmation example, when the second user receives digital confirmation of the completed cash payment or transfer, a messaging interface 300 may display a message confirming the completed transaction and indicating, for instance, "Jane Doe just sent you $50.00 for dinner @ Restaurant Dawn." Moreover, a similar confirmation message (along with a similar sensor responsive element having similar functionalities) may be displayed on a messaging interface of the client device associated with the first user.

As shown, the confirmation message may be configured with a sensor responsive element 302. For example, the sensor responsive element 302 may be a virtual holographic film overlaid on top of the message, which may dynamically change colors and/or shimmer, sheen, shine, sparkle, etc. as the second user tilts or otherwise moves the client device at various viewing angles with respect to the display screen. The sensor responsive element 302 may be configured to react to sensor data generated by at least a gyroscope sensor or any similar movement sensor of the client device. In at least that regard, if the second user receives a transaction confirmation message that does not include a sensor responsive element, such as the shown virtual holographic film, or if the message does include a sensor responsive element but does not dynamically react to sensor data, such as movement data, then the second user can quickly determine that the confirmation message is a counterfeit.

It may be understood that the virtual holographic film may cover or overlay only a portion of the confirmation message and not the entire surface area of the message. It may be further understood that the color, shimmer, sheen, shine, sparkle, film pattern configurations can be selected and implemented in any suitable manner.

Figure 3B:
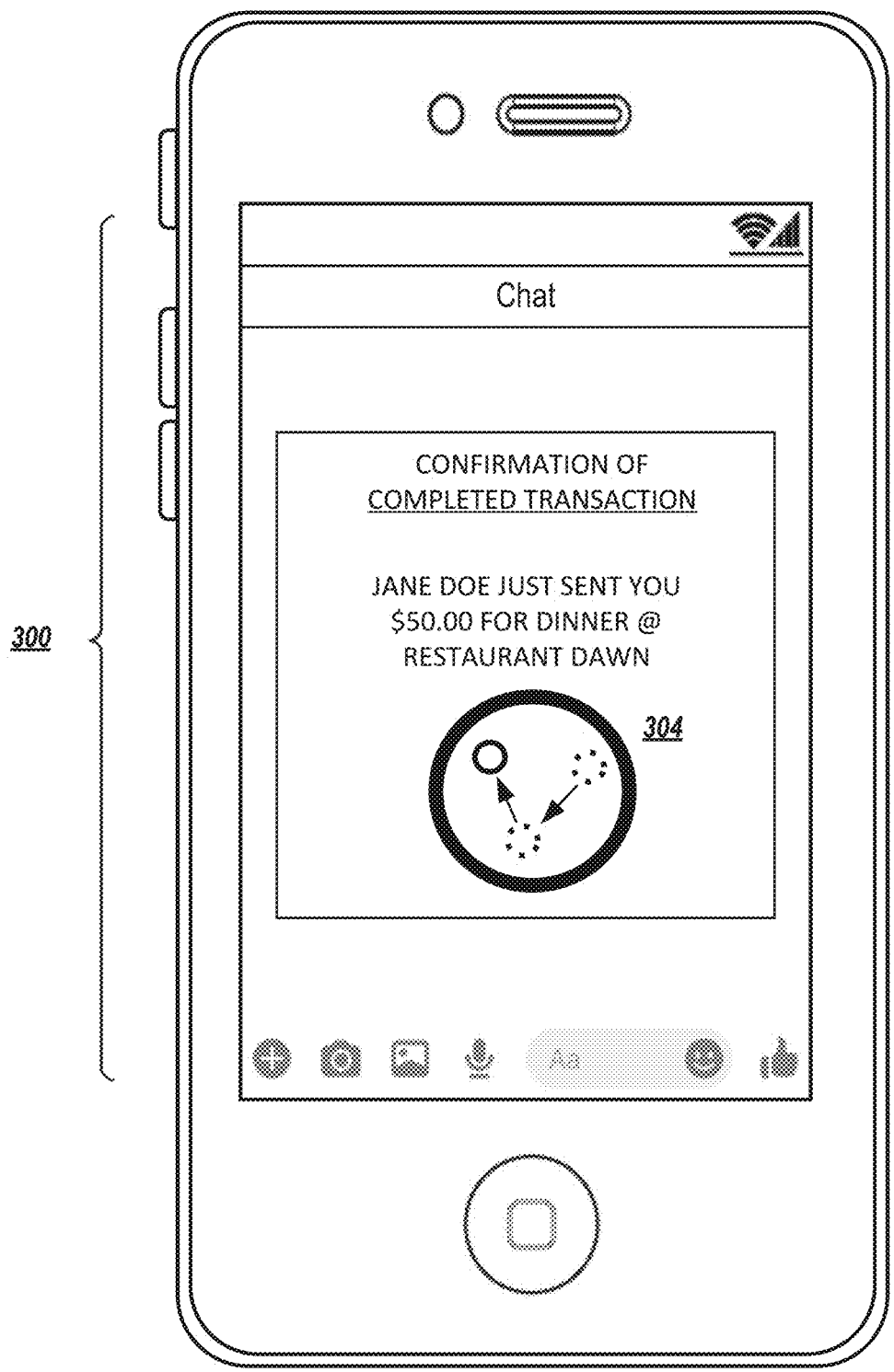
FIG. 3B depicts a second exemplary sensor responsive element.

FIG. 3B depicts an exemplary sensor responsive element 304 according to one or more embodiments. Similar to the sensor responsive element 302 of FIG. 3A, the sensor responsive element 304 may react to movement data generated by at least a gyroscope sensor or other movement sensors. For example, the messaging interface 300 may display the same transaction confirmation message indicating that Jane Doe had transferred $50 for dinner at Restaurant Dawn.

In embodiments, the sensor responsive element 304 may be a virtual "inclinometer" that includes at least two shapes, one of which may be configured to physically move relative to stationary position(s) of the other shape(s). For example, the virtual inclinometer may include a smaller inner circle as the first shape and a bigger outer circle as the second shape. As the second user tilts, shakes, or otherwise varies the position of the client device, the smaller inner circle may physically move around within the bigger circle, for example, the dashed smaller circles and arrows indicating the movement path of the smaller circle in accordance with detected sensor data. In at least that manner, similar to the sensor responsive element 302 described above, the second user may be able to verify that the transaction confirmation is authentic.

While the first and second shapes of the virtual inclinometer shown in FIG. 3B are circles, any suitable shape and the manner in which they interact are contemplated. Moreover, the above described example is not limited to shapes, but may be any image (two dimensional or three dimensional or otherwise) or any graphical item or interface. Further, it may be understood that none of the shapes, images, graphical item or interface are required to be stationary and may all move relative to each other.

Figure 3C:
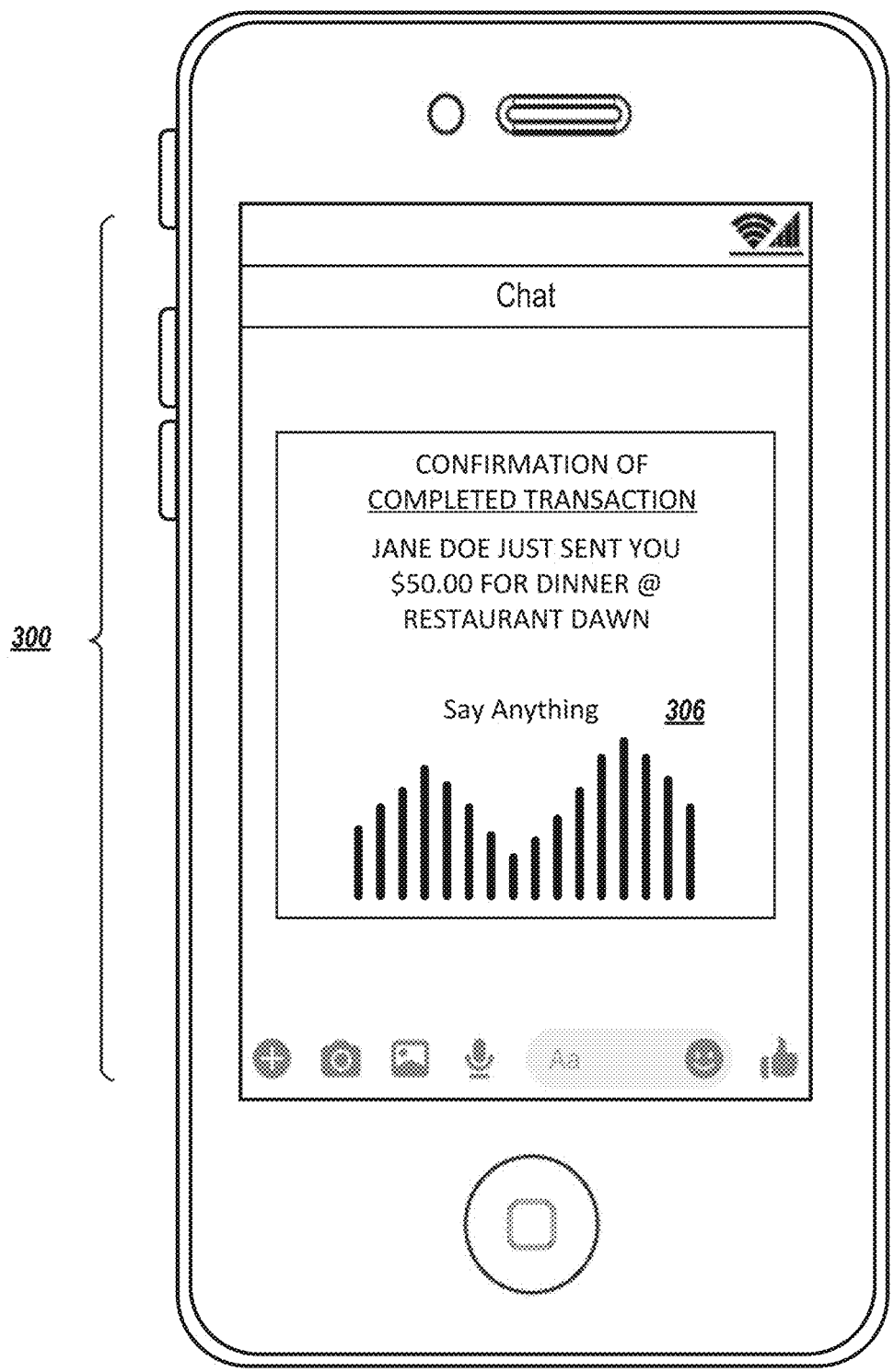
FIG. 3C depicts a third exemplary sensor responsive element.

FIG. 3C depicts an exemplary sensor responsive element 306 according to one or more embodiments. Different from the sensor responsive elements 302 and 304 of FIGS. 3A and 3B, the sensor responsive element 306 shown in FIG. 3C may be configured to dynamically react to user voice, user speech, user voice frequencies, or the like via a microphone.

As shown, the transaction confirmation message may be displayed on the messaging interface 300 of the client device. In examples, the second user may be instructed to say or speak any utterance via the microphone. When the user does so, the individual bars may animate up or down according to the voice frequencies and speech volume level. In other examples, the colors of the bars, the vertical (or lateral) movement of the bars, and the size of the bars, may change in response to different frequencies and/or speech volume.

Advantageously, by configuring the sensor responsive element 306 to dynamically react to speech or voice input data, the second user may be able to quickly discern that the transaction confirmation message is legitimate.

Figure 3D:
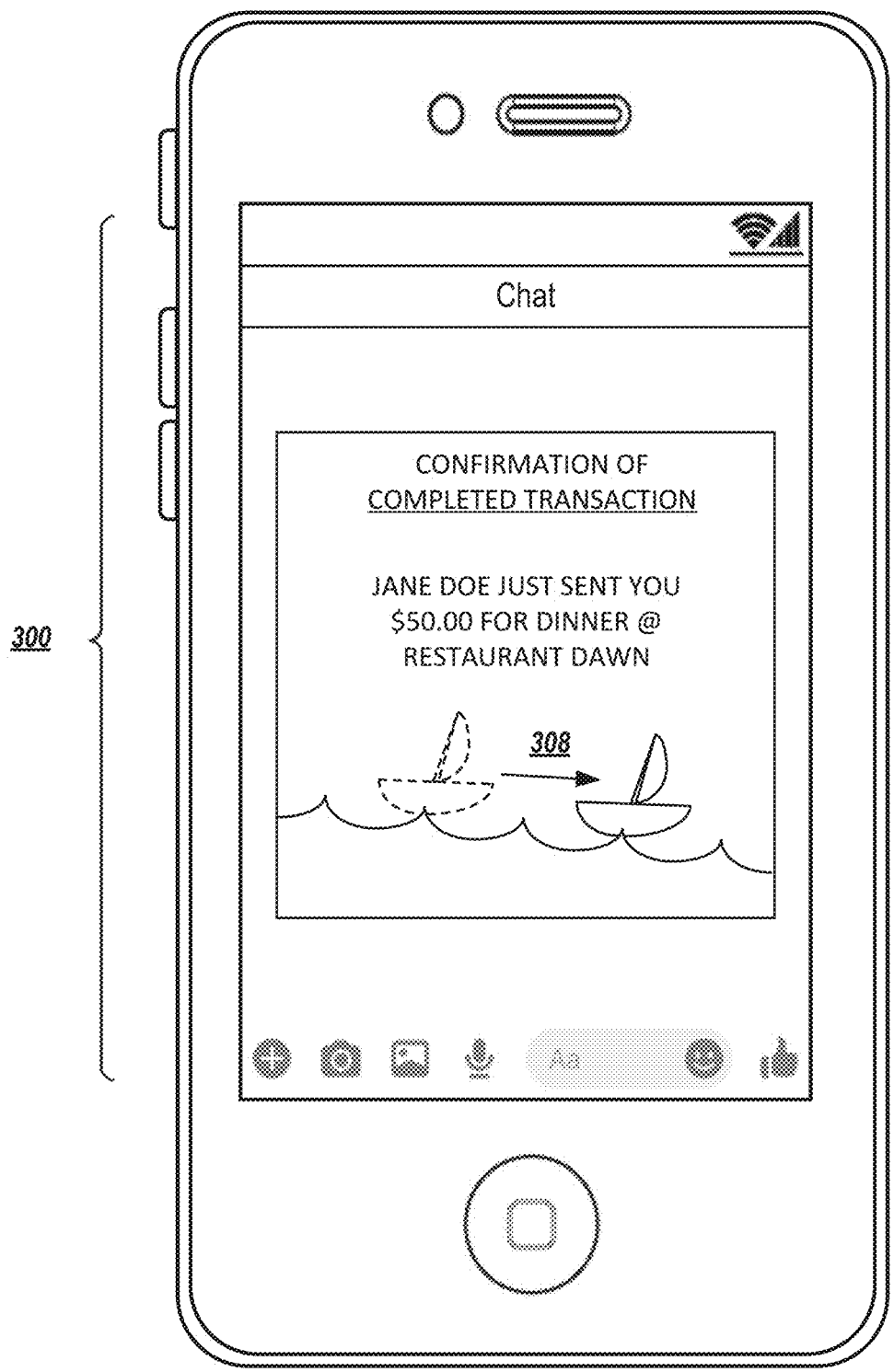
FIG. 3D depicts a fourth exemplary sensor responsive element.

FIG. 3D depicts an exemplary sensor responsive element 308 according to one or more embodiments. Different from the sensor responsive elements 302, 304 and further different from the sensor responsive element 306 of FIG. 3C, the sensor responsive element 308 may be configured to dynamically react to user interaction with a graphical interface via an image sensor (e.g., camera) and/or a microphone. In examples, the dynamic reaction may be in the form of an animation of the graphical interface.

As shown, the graphical interface of the sensor responsive element 308 may be a sailboat floating on water and it may be initially positioned closer to the left-hand side of the transaction confirmation message displayed on the messaging interface 300. The second user may blow air on the display screen of the client device from the left side, which can be detected via the camera and/or the microphone, thereby causing the sailboat to drift towards the right-hand side of the message, as indicated by the dashed outline of the boat and the arrow.

Similar to the other above described sensor responsive elements, sensor responsive element 308 also provides the second user a quick way of inspecting the authenticity of the transaction confirmation message based on interactive gestures by the user and graphical interface animation in accordance with those gestures. Other suitable types of user interaction with the sensor responsive element 308 are possible, such as waving the user's hand in front of the client device to gesture air movement.

Figure 3E:
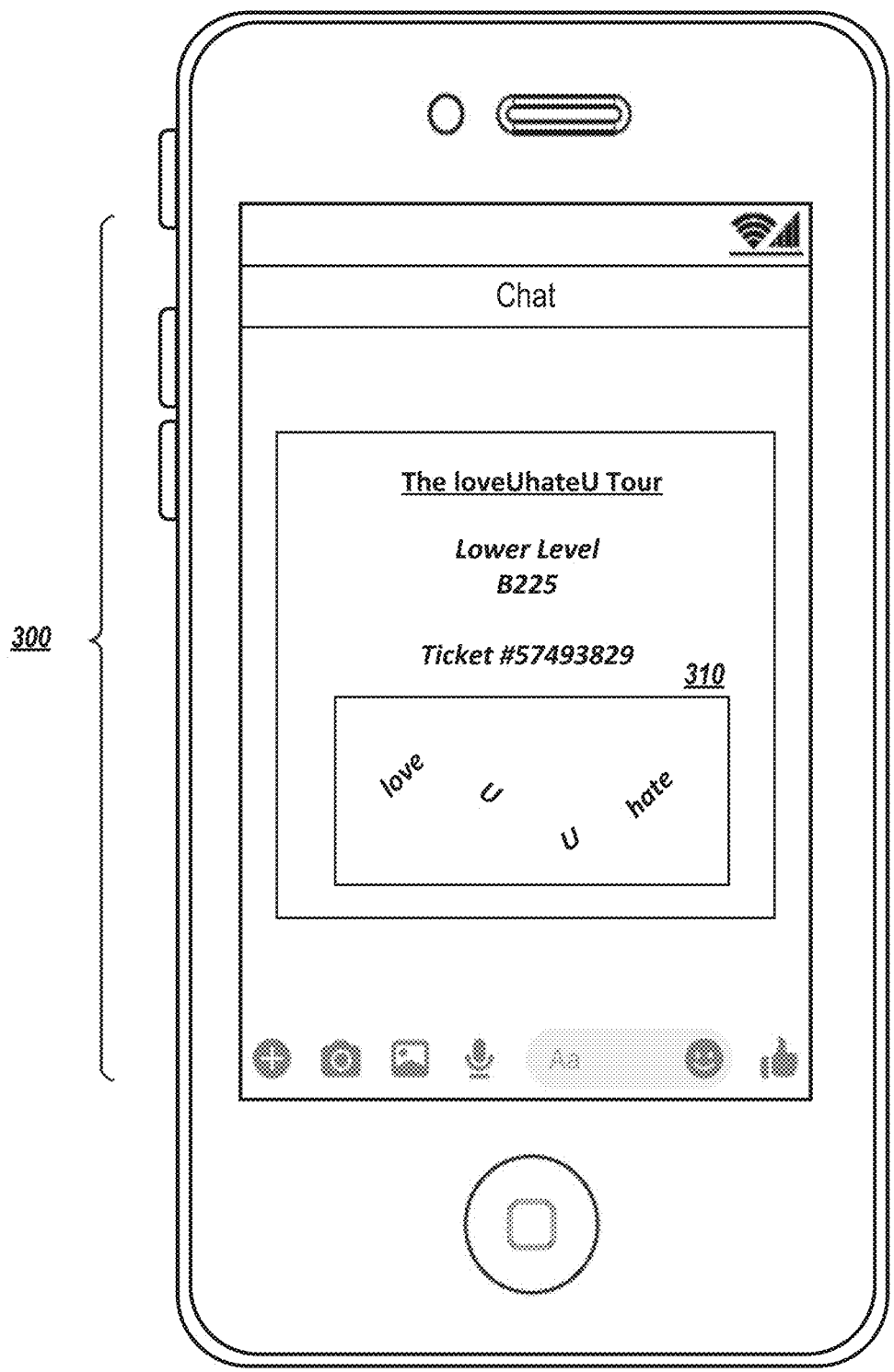
FIG. 3E depicts a fifth exemplary sensor responsive element.

FIG. 3E depicts an exemplary sensor responsive element 310 according to one or more embodiments. As shown, the digital content received by the client device is the digital copy of the musical concert ticket described above. The messaging interface 300 may display the ticket, which indicates the name of the artist's tour ("The loveUhateU Tour"), seating information (lower level B225), and the ticket number (#57493829).

The sensor responsive element 310 may be similar to the virtual inclinometer illustrated in FIG. 3B, except that one or more portions (e.g., words, letters) of the name of the tour may move or bounce around within a larger outer rectangle. Thus, the user may be able to enter or re-enter the concert by shaking the client device and showing that the words/letters "love," "U," "U," and "hate" bounce around within the rectangle. For purposes of consistency, all sensor responsive elements configured, embedded, or attached to all digital tickets for the particular musical concert may be functionally and visually identical. In some instances, the sensor responsive elements may be designed differently for VIP guests or backstage guests.

While the above described sensor responsive elements are configured to dynamically respond to sensor data generated by a gyroscope sensor, camera, and a microphone, the elements may also be configured to other types of sensor data or any other data generated by an input device, such as a mouseover action based on sensor data generated by a mouse or a keyboard action generated by a keyboard. Accordingly, stationary computing devices that do not include gyroscope sensors or similar movement-based sensors may also be able to support or execute any received sensor responsive elements from other types of sensor devices such as a mouse or keyboard. Moreover, numerous types of sensors may be used to generate data for the sensor responsive elements including but not limited to an accelerometer, touch, a proximity sensor, a barometer, a magnetometer, a hall effect sensor, or any suitable sensor or detection mechanism that generates responsive data. Further, other applications or use cases of configuring digital content with sensor responsive elements are possible, such as in the context of AR/VR content. For example, a sensor responsive element may be configured onto a virtual item or good being exchanged between a first AR/VR user and a second AR/VR user to at least assert the authenticity of the virtual item or good. The sensor responsive element in AR/VR contexts may react or respond to audio and/or visual signal (e.g., shaking the virtual item or good in a specific pattern to reveal a virtual hologram of the source, uttering a specific phrase or saying to reveal the authenticity of the virtual item or good) such that counterfeited virtual items or goods would not be able to have appropriate AR/VR-based sensor-responsivity.

Exemplary Digital Content Distribution and Sensor Responsive Element Configuring According to embodiments, digital content may originate from a source other than the one or more intermediate messaging servers 104, such as internal sources (e.g., authenticated client devices connected to the messaging platform, unauthenticated devices connected to the platform) and external sources (e.g., outside e-mail servers, outside server computers, outside client devices not connected to the messaging platform, outside mobile-based communication systems and components), where the messaging servers 104 would then distribute the digital content to the intended recipients. In examples, the sending client device may request that a sensor responsive element be configured or embedded to the digital content via an indicator, which may be a tag, a flag, code, token, or any suitable thing that indicates to the backend intermediate messaging servers that a sensor responsive element is requested. In other examples, the intermediate messaging servers may automatically identify or determine that specific types of digital content may require a sensor responsive element due to involved security vulnerabilities associated with the digital content, such as sensitive e-mails, messages from particular users or parties (e.g., IT department), etc.

Figure 4:
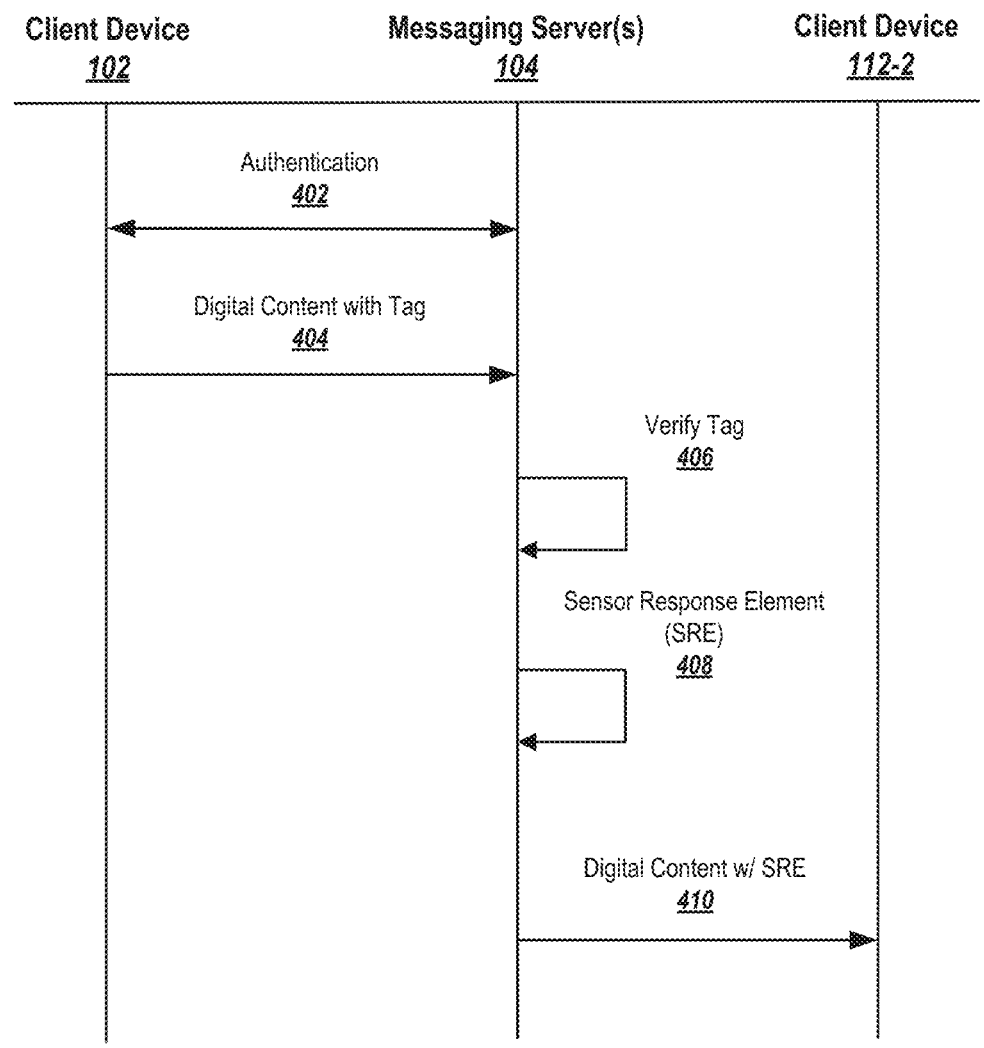
FIG. 4 depicts a second exemplary data flow diagram.

FIG. 4 depicts an exemplary data flow diagram 400 according to one or more embodiments. For ease of explanation, similar to FIG. 2, the system 100 and components thereof will be used to describe the features of the flow diagram 400 of FIG. 4. As shown, authentication 402 of the sending client device 102 may be performed via the authentication techniques (e.g., OTP, user login and password, biometric access, etc.) described above.

Once authenticated, the sending client device 102 may send digital content to the receiving client device 112-2. In examples, the one or more intermediate messaging servers 104 may receive the digital content from the sending client device 102. As shown, the digital content may include or be embedded with a tag 404, which indicates a request for the digital content to be configured with at least one sensor responsive element. When such a request via the tag is received by the backend servers, the servers may verify whether the digital content originates from an authenticated or verified source. Since the sending client device 102 has already been authenticated via authentication 402, the intermediate messaging servers 104 may determine that the sending client device 102 is indeed a verified source.

Thereafter, the one or more intermediate messaging servers 104 may verify whether the tag is valid 406. In some embodiments, a predefined or predetermined number of tags may be allotted for each authenticated or verified user on the messaging platform (otherwise may be referred to as a tag limit). Depending on the user, the number of allotted tags may be assigned differently. For instance, if an IT department or administrator of an enterprise is the authorized or verified user of the messaging platform, the IT department or administrator may be allotted more tags than other users based at least on the assumption that more tags will be used. The messaging servers 104 may verify that the sending client device 102 has not exceeded its predefined tag limit or tag quota. One of the numerous advantages of limiting the number of tags is reducing unnecessary requests for sensor responsive elements and further increasing overall security of the messaging platform and associated communication system(s). In further embodiments, the digital content may include a configuration (e.g., "config") that may identify one or more parameters, one or more limitations, or the like associated with the sensor responsive element to be satisfied. For example, a parameter may indicate that a sensor responsive element be configured on to every single content sent by the sending client device 102. In another example, the parameter may indicate that the sensor responsive element be configured onto content sent only to particular recipient(s). The config may be generated by the source of the digital content, the recipient of the content, and/or the one or more intermediate messaging servers 104.

After verifying the tag, the backend messaging servers 104 may generate or provide a sensor responsive element and configure or embed the digital content with the sensor responsive element 408. Thereafter, the digital content 410 with the configured element may be sent to the receiving client device 112-2. It may be understood that, in examples, a user may request the sensor responsive element by indicating such in the messaging interface via an icon, button, by an indication in the message, or in any other suitable way. The action may cause the tag to be applied to the digital content. Advantageously, end users of the messaging platform are thus empowered and encouraged to indicate that the digital content being communicated is in fact legitimate and not counterfeited thereby further increasing the overall security and trustworthiness of the messaging platform and associated communication systems. Establishing authenticity of digital content may be particularly important in common information phishing scenarios, such as messages, emails, files, documents, attachments or the like that are sent to end users by malicious actors or fraudsters pretending they originated from the messaging platform provider, a particular service provider, IT administrators, the IT department, etc.

In further examples, the digital content may originate from an unverified or unauthenticated source, such as a computing device external to the messaging platform. For instance, an external user may send a message (e.g., e-mail, text, SMS, voice message, etc.) to a user of the messaging platform. Thus, in some instances, digital content from external sources may automatically be treated as untrustworthy and may require a sensor responsive element to be configured to or embedded in the digital content before it can be distributed to the messaging platform recipient.

The one or more intermediate messaging servers 104 may determine whether the external source can be verifiable. For example, the servers 104 may identify and analyze all possible types of information from the digital content. If the digital content is an e-mail, it may include at least a digital signature, which may be a message digest or a cryptographic checksum that has been encrypted with the sender's private key to certify the contents. It may be understood that digital signatures may achieve at least two functions: integrity (e.g., a digital signature indicates whether the message or file has been modified) and authentication (e.g., a digital signature makes it possible to mathematically verify the name of the user signing the message), and in some instances, non-repudiation, which may be related to the sender not being able to claim that the sender did not sign the original message since message was signed with the sender's private key.

In at least that regard, the intermediate messaging servers 104 may analyze the digital signature, the message digest, etc. of the e-mail message or file and determine verify the integrity and authentication of the digital content. If the digital content is verified as being legitimate, the intermediate messaging servers 104 may automatically configure or embed the sensor responsive element to the digital content and send it to the intended recipient device on the messaging platform. In yet further embodiments, in an exemplary implementation, a client device, system, and/or software may perform authenticity check(s) or otherwise verify the authenticity of the digital content on its own, for instance, by using metadata (e.g., alphanumeric codes, signatures) associated with the digital content, and optionally, in consultation with one or more third party backend systems. In some instances, the client device, system, and/or software may thus perform and may be responsible for the configuring the digital content with the sensor responsive element.

It may be understood that digital content from related or "sibling" or cross-platform messaging systems (which may implement different authentication, anti-counterfeiting, and/or security-based procedures or protocols) may be verified via similar techniques since the digital content would technically originate from an external source, but verifiable information associated with the sender of the digital content may be more accessible in these instances. An example of a cross-platform messaging system may be a different messaging platform that includes users who share relationships with one or more users of the primary messaging platform (e.g., via contact lists, previous contact histories, etc.). In some examples, cross-platform users may be automatically considered a trusted source.

In some instances of above described embodiments and examples, the one or more intermediate messaging servers may implement an importance factor threshold for determining whether to configure digital content with a sensor responsive element since users can become desensitized to sensor responsive elements if they are included in all digital content platform wide. Thus, when the intermediate messaging servers determine that the importance factor threshold has been met, only then would the digital content be configured with the sensor responsive element. Factors that may contribute to the importance factor threshold include at least security or counterfeiting vulnerabilities associated with the digital content, sensitivity level of the information contained in the digital content, sender of the content, etc. The threshold can be dynamically adjusted, e.g., raised, lowered, based on at least the number of sensor responsive elements that are generated and the effect of that number on the overall security and anti-counterfeiting purposes of the messaging platform in real-time or near real-time.

Advantageously, the one or more backend messaging servers of the messaging platform are configured to be highly flexible when facilitating the communication of digital content, as set forth in at least the examples above, by being proactive in directly generating the digital content and configuring the sensor responsive element to the content or by distributing or relaying digital content that originated elsewhere but verifying or authentication the source of the digital content and configuring the sensor responsive element to the content prior to sending or distributing to the recipient client devices.

Exemplary Logic

Exemplary logic for implementing the above-described embodiments is next described in connection with FIG. 5. The exemplary logic may be implemented in hardware, software, or a combination of hardware and software (e.g., being implemented at least partially in hardware).

Figure 5:
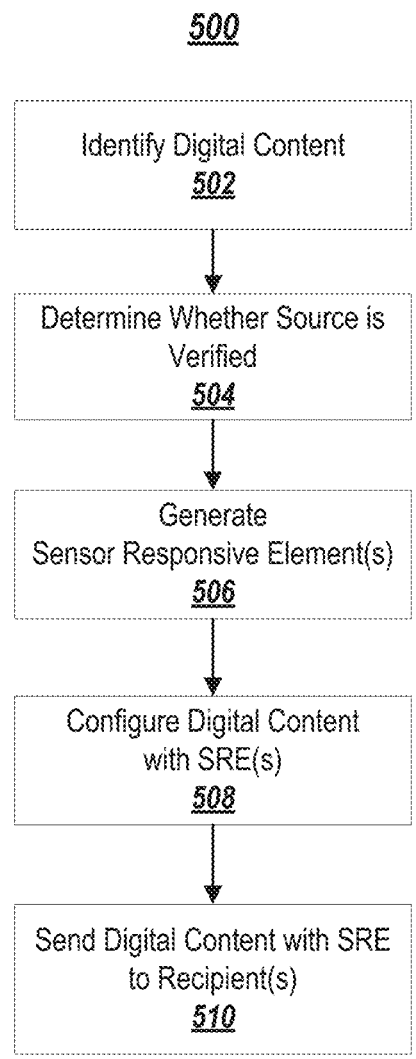
FIG. 5 depicts an exemplary flowchart.

FIG. 5 is a flowchart depicting exemplary logic 500 performed by a system or system components, such as one or more backend servers (e.g., intermediate messaging servers), for generating a sensor responsive element and configuring digital content with the sensor responsive element, as described above. The logic 500 may be embodied as digital logic, which may be implemented at least partially in hardware, embodying instructions for a processor circuit to perform the steps described below. Although FIG. 5 depicts a particular arrangement of logical elements in a particular order, it is understood that the configuration depicted in FIG. 5 is but one example. In other embodiments, more elements may be provided and/or some elements may be omitted, some elements may be performed in parallel, and/or elements may be performed in a different order.

At block 502, digital content to be sent to a client device associate with a user of a communication system (e.g., messaging platform or portions thereof) may be identified. As described above, the digital content may be generated by the one or more messaging servers, or may originate from a source internal or external to the communication system for distribution to intended recipients. In examples, the digital content may be generated by the messaging server(s) in instances or use cases where the messaging servers communicate with one or more third party servers to receive confirmation or further information regarding a specific transaction, such as a transaction related to a cash payment or transfer initiated by one end user or end users purchasing digital tickets for a particular event, as set forth above.

At block 504, it may be determined whether the source of the digital content is a verified or authenticated source. For example, the source may be considered authenticated or verified if the source is a user of the messaging platform who has properly logged in to the user's messaging platform account by inputting credentials (e.g., OTP code, username and password, biometric access). The source, however, may not be considered authenticated or verified if it is "outside" of or external to the communication system. Stated differently, for instance, if the source is not properly part of or connected to the messaging platform, it is considered unauthenticated or unverified.

At block 506, in response to the source being an authenticated or verified source, one or more sensor responsive elements may be generated. As described above, the sensor responsive elements may be at least visual interfaces that can dynamically respond or react to sensor data generated from one or more sensors of a client device, which allows the receiving user to quickly inspect or verify whether the digital content being configured with the sensor responsive element(s) is legitimate or fake.

At block 508, the digital content identified at block 502 may be configured with the one or more sensor responsive elements generated at block 506. As described above, the sensor responsive elements may be associated with or linked to the digital content being authenticated by way of an identifier at least for record keeping purposes and heightening overall security of the communication system. And, at block 510, the digital content that has been configured with the one or more sensor responsive elements may be sent to one or more recipients or receiving client devices of the communication system.

Communications System Overview

Figure 6B:
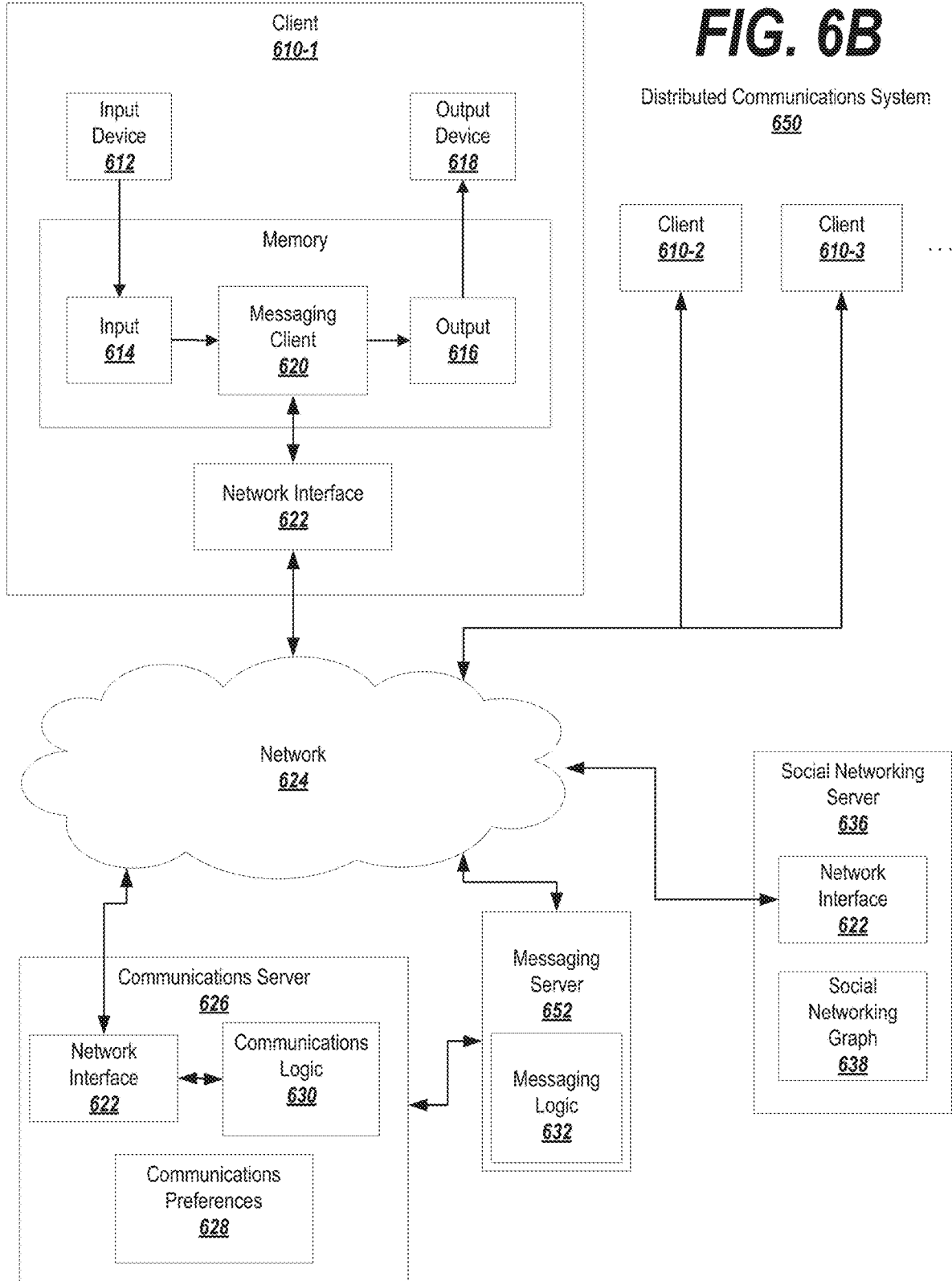
FIG. 6B depicts an exemplary distributed communications service.

These examples may be implemented by a communications system that is provided locally, at a client device, or remotely (e.g., at a remote server), or some combination thereof. FIGS. 6A and 6B depict various examples of communications systems, and are discussed in more detail below.

FIG. 6A depicts an exemplary centralized communications system 600, which facilitates encrypted communication between two or more users (e.g., business page user and a potential customer user). The centralized system 600 may implement some or all of the structure and/or operations of a messaging or communications service in a single computing entity, such as entirely within a single centralized messaging server device, e.g., communications server 626.

The communications system 600 may include a computer-implemented system having software applications that include one or more components. Although the communications system 600 shown in FIG. 6A has a limited number of elements in a certain topology, the communications system 600 may include more or fewer elements in alternate topologies.

A communications system 600 may be generally arranged to receive, store, and deliver communications, such as messages. The communications may include or may be associated with media or content items.

A client device 610 may transmit communications addressed to one or more recipient users, user accounts, or other identifiers resolving to receiving client devices 610. In exemplary embodiments, each of the client devices 610 and their respective messaging clients 620 are associated with a particular user or users of the communications service 600. In some embodiments, the client devices 610 may be cellular devices such as smartphones and may be identified to the communications service 600 based on a phone number associated with each of the client devices 610. In some embodiments, each client may be associated with a user account registered with the communications service 600. In general, each client may be addressed through various techniques for the reception of communications. While in some embodiments the client devices 610 may be cellular devices, in other embodiments one or more of the client devices 610 may be personal computers, tablet devices, any other form of computing device.

The client 610 may include one or more input devices 612 and one or more output devices 618. The input devices 612 may include, for example, microphones, keyboards, cameras, electronic pens, touch screens, and other devices for receiving inputs including message data, requests, commands, user interface interactions, selections, and other types of input. The output devices 618 may include a speaker, a display device such as a monitor or touch screen, and other devices for presenting an interface to the communications system 600.

The client 610 may include a memory, which may be a non-transitory computer readable storage medium, such as one or a combination of a hard drive, solid state drive, flash storage, read only memory, or random-access memory. The memory may a representation of an input 614 and/or a representation of an output 616, as well as one or more applications. For example, the memory may store a messaging client 620 and/or a social networking client that allows a user to interact with a social networking service.

The input 614 may be textual, such as in the case where the input device 612 is a keyboard. Alternatively, the input 614 may be an audio or video recording, such as in the case where the input device 612 is a microphone or camera.

The input 614 may be subjected to automatic speech recognition (ASR) logic in order to transform the audio recording to text that is processable by the communication system. The ASR logic may be located at the client device 610 (so that the audio recording is processed locally by the client 610 and corresponding text is transmitted to the communications server 626), or may be located remotely at the communications server 626 (in which case, the audio recording may be transmitted to the communications server 626 and the communications server 626 may process the audio into text). Other combinations are also possible—for example, if the input device 612 is a touch pad or electronic pen, the input 614 may be in the form of handwriting, which may be subjected to handwriting or optical character recognition analysis logic in order to transform the input 612 into processable text.

The client 610 may be provided with a network interface 622 for communicating with a network 624, such as the Internet. The network interface 622 may transmit the input 612 in a format and/or using a protocol compatible with the network 624 and may receive a corresponding output 616 from the network 624.

The network interface 622 may communicate through the network 624 to a communications server 626, which may be operative to receive, store, and forward messages between messaging clients.

The communications server 626 may include a network interface 622, communications preferences 628, and communications logic 630. The communications preferences 628 may include one or more privacy settings for one or more users and/or video communications. For example, the communications preferences 628 may include one or more settings, including default settings, for the logic described herein.

The communications logic 630 may include digital content anti-counterfeiting logic 632 for at least generating one or more sensor responsive elements and configuring digital content being communicated in the network with the generated sensor responsive elements via the communications server 626, as described above.

The network interface 622 of the client 610 and/or the communications server 626 may also be used to communicate through the network 624 with a social networking server 636. The social networking server 636 may include or may interact with a social networking graph 638 that defines connections in a social network. Furthermore, the communications server 626 may connect to the social networking server 636 for various purposes, such as retrieving connection information, messaging history, event details, etc. from the social network.

A user of the client 610 may be an individual (human user), an entity (e.g., an enterprise, business, or third-party application), or a group (e.g., of individuals or entities) that interacts or communicates with or over the social networking server 636. The social-networking server 636 may be a network-addressable computing system hosting an online social network. The social networking server 636 may generate, store, receive, and send social-networking data, such as, for example, user-profile data, concept-profile data, social-graph information, or other suitable data related to the online social network. The social networking server 636 may be accessed by the other components of the network environment either directly or via the network 624.

The social networking server 636 may include an authorization server (or other suitable component(s)) that allows users to opt in to or opt out of having their actions logged by social networking server 636 or shared with other systems (e.g., third-party systems, such as the communications server 626), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social networking server 636 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example, and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example, and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 638. Privacy settings of a social-graph element, such as a node or an edge, may specify how the social-graph element, information associated with the social-graph element, or content objects associated with the social-graph element can be accessed using the online social network. As an example, and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 636 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 636 may send a request to the data store for the object. The request may identify the user associated with the request. The requested data object may only be sent to the user (or a client system 610 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social networking server 636 or explicit connections of a user to a node, object, entity, brand, or page on social networking server 636. In addition, or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 6A may be well-suited to deployment as a new system or as an upgrade to an existing system, because the logic is incorporated into the communications server 626. In contrast, FIG. 6B depicts an exemplary distributed communications system 650, in which functionality for selecting dominant/relevant participants and displaying a reduced-size interface is distributed and remotely accessible from the messaging server. Examples of a distributed system 650 include a client-server architecture, a 3-tier architecture, an N-tier architecture, a tightly coupled or clustered architecture, a peer-to-peer architecture, a master-slave architecture, a shared database architecture, and other types of distributed systems.

Many of the components depicted in FIG. 6B are identical to those in FIG. 6A, and a description of these elements is not repeated here for the sake of brevity. The primary difference between the centralized embodiment and the distributed embodiment is the addition of a separate messaging server 652, which hosts the relevant messaging logic 632. The messaging server 652 may be distinct from the communications server 626 but may communicate with the communications server 626, either directly or through the network 624, to provide the functionality of the messaging logic 632 to the communications server 626.

The embodiment depicted in FIG. 6B may be particularly well suited to allow exemplary embodiments to be deployed alongside existing messaging or communication systems, for example when it is difficult or undesirable to replace an existing messaging server. Additionally, in some cases the communications server 626 may have limited resources (e.g. processing or memory resources) that limit or preclude the addition of the additional pivot functionality. In such situations, the capabilities described herein may still be provided through a separate messaging server, such as the messaging server 652.

Messaging Architecture

The embodiments described above may be performed by a messaging architecture, an example of which is next described with reference to FIG. 7.

Figure 7:
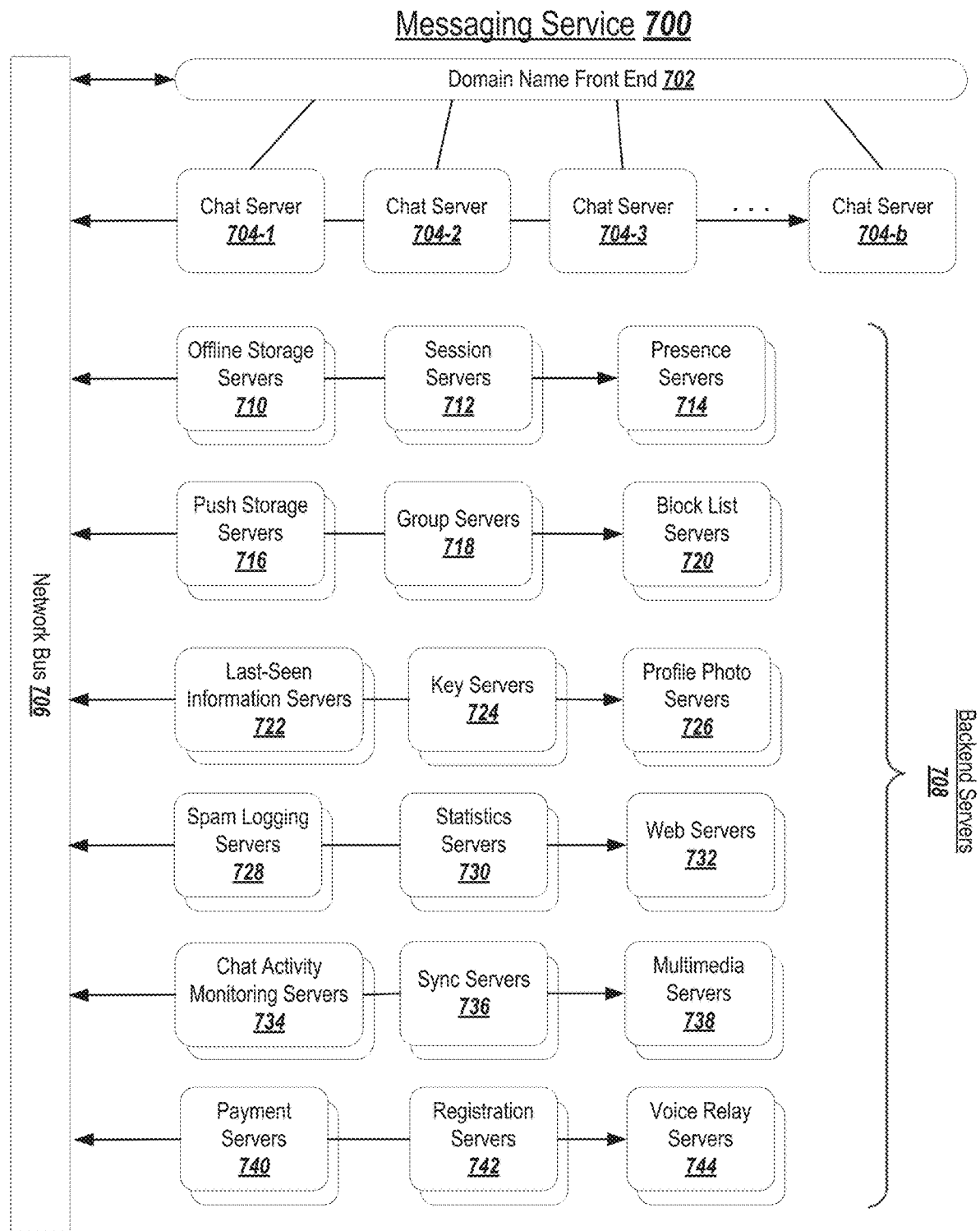
FIG. 7 depicts an exemplary messaging service system.

FIG. 7 illustrates an embodiment of a plurality of servers implementing various functions of a messaging service 700 suitable for use with exemplary embodiments. It will be appreciated that different distributions of work and functions may be used in various embodiments of a messaging service 700.

The messaging service 700 may comprise a domain name front end 702. The domain name front end 702 may be assigned one or more domain names associated with the messaging service 700 in a domain name system (DNS). The domain name front end 702 may receive incoming connections and distribute the connections to servers providing various messaging services.

The messaging service 702 may comprise one or more chat servers 704. The chat servers 704 may comprise front-end servers for receiving and transmitting user-to-user messaging updates such as chat messages. Incoming connections may be assigned to the chat servers 704 by the domain name front end 702 based on workload balancing.

The messaging service 700 may comprise backend servers 708. The backend servers 708 may perform specialized tasks in the support of the chat operations of the front-end chat servers 704. A plurality of different types of backend servers 708 may be used. It will be appreciated that the assignment of types of tasks to different backend serves 708 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 700 may comprise one or more offline storage servers 710. The one or more offline storage servers 710 may store messaging content for currently offline messaging clients in hold for when the messaging clients reconnect.

The messaging service 700 may comprise one or more sessions servers 712. The one or more session servers 712 may maintain session state of connected messaging clients.

The messaging service 700 may comprise one or more presence servers 714. The one or more presence servers 714 may maintain presence information for the messaging service 700. Presence information may correspond to user-specific information indicating whether or not a given user has an online messaging client and is available for chatting, has an online messaging client but is currently away from it, does not have an online messaging client, and any other presence state.

The messaging service 700 may comprise one or more push storage servers 716. The one or more push storage servers 716 may cache push requests and transmit the push requests to messaging clients. Push requests may be used to wake messaging clients, to notify messaging clients that a messaging update is available, and to otherwise perform server-side-driven interactions with messaging clients.

The messaging service 700 may comprise one or more group servers 718. The one or more group servers 718 may maintain lists of groups, add users to groups, remove users from groups, and perform the reception, caching, and forwarding of group chat messages.

The messaging service 700 may comprise one or more block list servers 720. The one or more block list servers 720 may maintain user-specific block lists, the user-specific incoming-block lists indicating for each user the one or more other users that are forbidden from transmitting messages to that user. Alternatively, or additionally, the one or more block list servers 720 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 700 may comprise one or more last seen information servers 722. The one or more last seen information servers 722 may receive, store, and maintain information indicating the last seen location, status, messaging client, and other elements of a user's last seen connection to the messaging service 700.

The messaging service 700 may comprise one or more key servers 724. The one or more key servers may host public keys for public/private key encrypted communication.

The messaging service 700 may comprise one or more profile photo servers 726. The one or more profile photo servers 726 may store and make available for retrieval profile photos for the plurality of users of the messaging service 700.

The messaging service 700 may comprise one or more spam logging servers 728. The one or more spam logging servers 728 may log known and suspected spam (e.g., unwanted messages, particularly those of a promotional nature). The one or more spam logging servers 728 may be operative to analyze messages to determine whether they are spam and to perform punitive measures, in some embodiments, against suspected spammers (users that send spam messages).

The messaging service 700 may comprise one or more statistics servers 730. The one or more statistics servers may compile and store statistics information related to the operation of the messaging service 700 and the behavior of the users of the messaging service 700.

The messaging service 700 may comprise one or more web servers 732. The one or more web servers 732 may engage in hypertext transport protocol (HTTP) and hypertext transport protocol secure (HTTPS) connections with web browsers.

The messaging service 700 may comprise one or more chat activity monitoring servers 734. The one or more chat activity monitoring servers 734 may monitor the chats of users to determine unauthorized or discouraged behavior by the users of the messaging service 700. The one or more chat activity monitoring servers 734 may work in cooperation with the spam logging servers 728 and block list servers 720, with the one or more chat activity monitoring servers 734 identifying spam or other discouraged behavior and providing spam information to the spam logging servers 728 and blocking information, where appropriate to the block list servers 720.

The messaging service 700 may comprise one or more sync servers 736. The one or more sync servers 736 may sync a messaging system (e.g., systems 100, 400) with contact information from a messaging client, such as an address book on a mobile phone, to determine contacts for a user in the messaging service 700.

The messaging service 700 may comprise one or more multimedia servers 738. The one or more multimedia servers may store multimedia (e.g., images, video, audio) in transit between messaging clients, multimedia cached for offline endpoints, and may perform transcoding of multimedia.

The messaging service 700 may comprise one or more payment servers 740. The one or more payment servers 740 may process payments from users. The one or more payment servers 740 may connect to external third-party servers for the performance of payments.

The messaging service 700 may comprise one or more registration servers 742. The one or more registration servers 742 may register new users of the messaging service 700.

The messaging service 700 may comprise one or more voice relay servers 744. The one or more voice relay servers 744 may relay voice-over-internet-protocol (VoIP) voice communication between messaging clients for the performance of VoIP calls.

Figure 8:
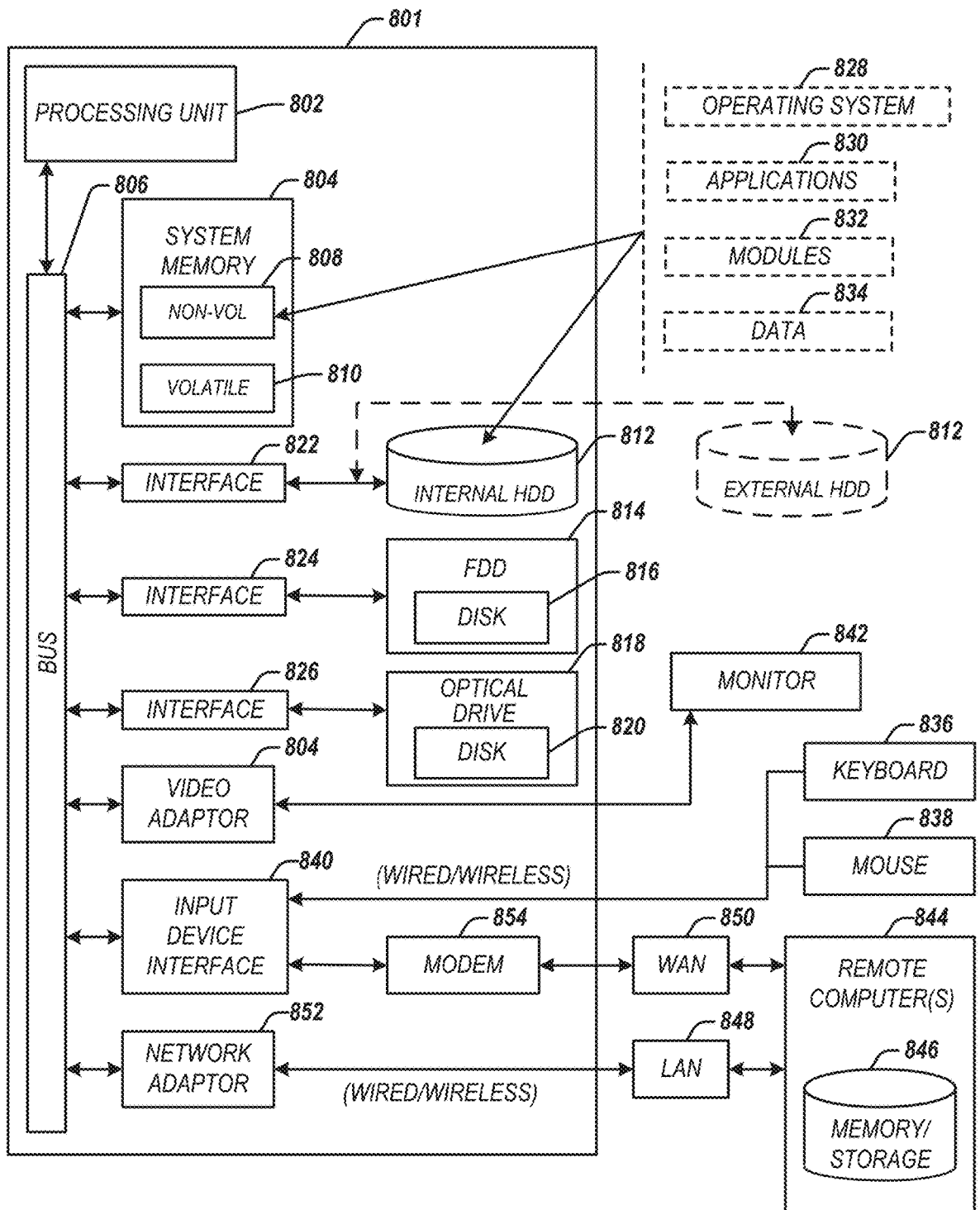
FIG. 8 depicts an exemplary computing architecture.

The above-described examples, features, methods may be embodied as instructions on a computer readable medium or as part of a computing architecture. FIG. 8 illustrates an embodiment of an exemplary computing architecture 800 suitable for implementing various embodiments as previously described. In one embodiment, the computing architecture 800 may comprise or be implemented as part of an electronic device, such as a computer 801. The embodiments are not limited in this context.

As used in this application, the terms "system" and "component" are intended to refer to a computer-related entity, either hardware, a combination of hardware and software, software, or software in execution, examples of which are provided by the exemplary computing architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 800 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 800.

As shown in FIG. 8, the computing architecture 800 comprises a processing unit 802, a system memory 804 and a system bus 806. The processing unit 802 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 802.

The system bus 806 provides an interface for system components including, but not limited to, the system memory 804 to the processing unit 802. The system bus 806 can be any of several types of bus structure that may further interconnect to a memory bus (with or without a memory controller), a peripheral bus, and a local bus using any of a variety of commercially available bus architectures. Interface adapters may connect to the system bus 806 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 800 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile memory 808 and/or volatile memory 810. A basic input/output system (BIOS) can be stored in the non-volatile memory 808.

The computing architecture 800 may include various types of computer-readable storage media in the form of one or more lower speed memory units, including an internal (or external) hard disk drive (HDD) 812, a magnetic floppy disk drive (FDD) 814 to read from or write to a removable magnetic disk 816, and an optical disk drive 818 to read from or write to a removable optical disk 820 (e.g., a CD-ROM or DVD). The HDD 812, FDD 814 and optical disk drive 820 can be connected to the system bus 806 by an HDD interface 822, an FDD interface 824 and an optical drive interface 826, respectively. The HDD interface 822 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 808, 812, including an operating system 828, one or more application programs 830, other program modules 832, and program data 834. In one embodiment, the one or more application programs 830, other program modules 832, and program data 834 can include, for example, the various applications and/or components of the messaging systems 100 or 400.

A user can enter commands and information into the computer 801 through one or more wire/wireless input devices, for example, a keyboard 836 and a pointing device, such as a mouse 838. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 802 through an input device interface 840 that is coupled to the system bus 806, but can be connected by other interfaces such as a parallel port, IEEE 694 serial port, a game port, a USB port, an IR interface, and so forth.

A monitor 842 or other type of display device is also connected to the system bus 806 via an interface, such as a video adaptor 844. The monitor 842 may be internal or external to the computer 801. In addition to the monitor 842, a computer typically includes other peripheral output devices, such as speakers, printers, and so forth.

The computer 801 may operate in a networked environment using logical connections via wire and/or wireless communications to one or more remote computers, such as a remote computer 844. The remote computer 844 can be a workstation, a server computer, a router, a personal computer, portable computer, microprocessor-based entertainment appliance, a peer device or other common network node, and typically includes many or all of the elements described relative to the computer 801, although, for purposes of brevity, only a memory/storage device 846 is illustrated. The logical connections depicted include wire/wireless connectivity to a local area network (LAN) 848 and/or larger networks, for example, a wide area network (WAN) 850. Such LAN and WAN networking environments are commonplace in offices and companies, and facilitate enterprise-wide computer networks, such as intranets, all of which may connect to a global communications network, for example, the Internet.

When used in a LAN networking environment, the computer 801 is connected to the LAN 848 through a wire and/or wireless communication network interface or adaptor 852. The adaptor 852 can facilitate wire and/or wireless communications to the LAN 848, which may also include a wireless access point disposed thereon for communicating with the wireless functionality of the adaptor 852.

When used in a WAN networking environment, the computer 801 can include a modem 854, or is connected to a communications server on the WAN 850, or has other means for establishing communications over the WAN 850, such as by way of the Internet. The modem 854, which can be internal or external and a wire and/or wireless device, connects to the system bus 806 via the input device interface 840. In a networked environment, program modules depicted relative to the computer 801, or portions thereof, can be stored in the remote memory/storage device 846. It will be appreciated that the network connections shown are exemplary and other means of establishing a communications link between the computers can be used.

The computer 801 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 9:
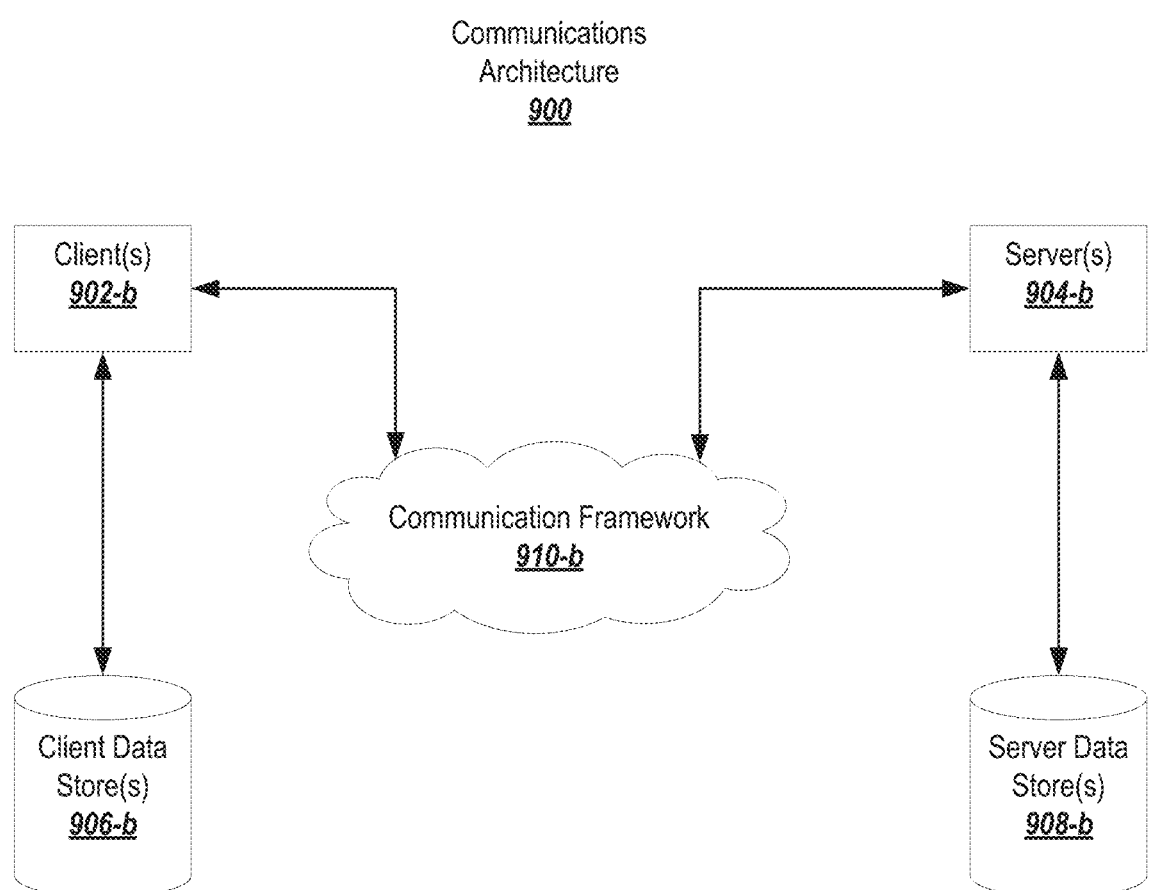
FIG. 9 depicts an exemplary communication architecture.

FIG. 9 is a block diagram depicting an exemplary communications architecture 900 suitable for implementing various embodiments as previously described. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 includes one or more clients 902 and servers 904. The clients 902 and the servers 904 are operatively connected to one or more respective client data stores 906 and server data stores 908 that can be employed to store information local to the respective clients 902 and servers 904, such as cookies and/or associated contextual information.

The clients 902 and the servers 904 may communicate information between each other using a communication framework 910. The communications framework 910 may implement any well-known communications techniques and protocols. The communications framework 910 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 910 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 10:
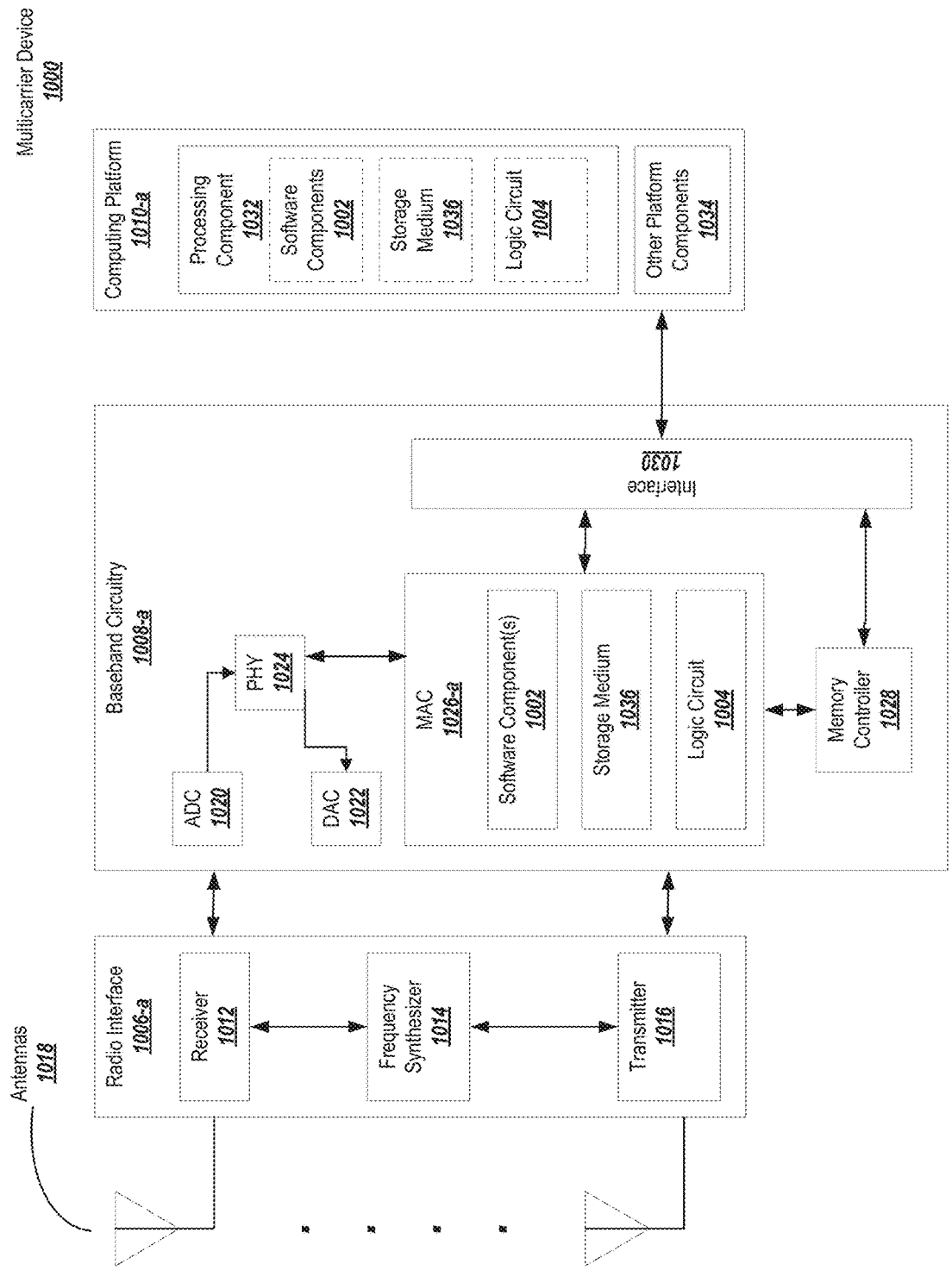
FIG. 10 depicts an exemplary multicarrier communications device.

FIG. 10 illustrates an embodiment of a device 1000 for use in a multicarrier OFDM system, such as the messaging systems 100 or 400. The device 1000 may implement, for example, software components 1002 as described with reference to the messaging logic or any related logic for sending or receiving digital content that has been configured with one or more sensor responsive elements. The device 1000 may also implement a logic circuit 1004. The logic circuit 1004 may include physical circuits to perform operations described for the messaging systems 100 or 400. As shown in FIG. 10, device 1000 may include a radio interface 1006, baseband circuitry 1008, and a computing platform 1010, although embodiments are not limited to this configuration.

The device 1000 may implement some or all of the structure and/or operations for the messaging systems 100 or 400 and/or logic circuit 1004 in a single computing entity, such as entirely within a single device. Alternatively, the device 1000 may distribute portions of the structure and/or operations for the messaging systems 100 or 400 and/or logic circuit 1004 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 1006 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 1006 may include, for example, a receiver 1012, a transmitter 1014 and/or a frequency synthesizer 1016. The radio interface 1006 may include bias controls, a crystal oscillator and/or one or more antennas 1018. In another embodiment, the radio interface 1006 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 1008 may communicate with the radio interface 1006 to process receive and/or transmit signals and may include, for example, an analog-to-digital converter 1020 for down converting received signals, and a digital-to-analog converter 1022 for up-converting signals for transmission. Further, the baseband circuitry 1008 may include a baseband or physical layer (PHY) processing circuit 1024 for PHY link layer processing of respective receive/transmit signals. The baseband circuitry 1008 may include, for example, a processing circuit 1026 for medium access control (MAC)/data link layer processing. The baseband circuitry 1008 may include a memory controller 1028 for communicating with the processing circuit 1026 and/or a computing platform 1010, for example, via one or more interfaces 1030.

In some embodiments, the PHY processing circuit 1024 may include a frame construction and/or detection module, in combination with additional circuitry such as a buffer memory, to construct and/or deconstruct communication frames, such as radio frames. Alternatively, or in addition, the MAC processing circuit 1026 may share processing for certain of these functions or perform these processes independent of the PHY processing circuit 1024. In some embodiments, MAC and PHY processing may be integrated into a single circuit.

The computing platform 1010 may provide computing functionality for the device 1000. As shown, the computing platform 1010 may include a processing component 1032. In addition to, or alternatively of, the baseband circuitry 1008, the device 1000 may execute processing operations or logic for the messaging systems 100 or 400 and logic circuit 1004 using the processing component 1032. The processing component 1032 (and/or the PHY 1024 and/or MAC 1026) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1010 may further include other platform components 1034. Other platform components 1034 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 1000 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 1000 described herein, may be included or omitted in various embodiments of the device 1000, as suitably desired. In some embodiments, the device 1000 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 1000 may be implemented using single input single output (SISO) architectures. However, certain implementations may include multiple antennas (e.g., antennas 1018) for transmission and/or reception using adaptive antenna techniques for beamforming or spatial division multiple access (SDMA) and/or using MIMO communication techniques.

The components and features of the device 1000 may be implemented using any combination of discrete circuitry, application specific integrated circuits (ASICs), logic gates and/or single chip architectures. Further, the features of the device 1000 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 1000 shown in the block diagram of FIG. 10 may represent one functionally descriptive example of many potential implementations. Accordingly, division, omission or inclusion of block functions depicted in the accompanying Figures does not infer that the hardware components, circuits, software and/or elements for implementing these functions would be necessarily be divided, omitted, or included in embodiments.

At least one computer-readable storage medium 1036 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more exemplary embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method comprising:
   identifying digital content to be sent to a client device associated with a user of a communication or computer system;
   determining whether a source of the digital content is authenticated or verified;
   in response to the determining that the source of the digital content is authenticated or verified, generating a sensor responsive element, wherein the sensor responsive element comprises a visual interface that dynamically responds to sensor data generated by one or more sensors of the client device associated with the user, wherein the sensor data comprises movement data, and the sensor response element to allow a first portion of the visual interface to move relative to a second portion of the visual interface in response to the movement data;

configuring the digital content with the sensor responsive element; and sending the digital content with the configured sensor responsive element to the client device associated with the user.

2. The method of claim 1, wherein determining whether the source of the digital content is authenticated or verified further comprises:

determining whether the source is an authorized user of the communication or computer system by at least receiving credential input from the source and determining whether the credential input matches the source; and in response to the determining that the credential input matches the source, confirming that the source of the digital content is an authorized user.

3. The method of claim 2, wherein the credential input comprises one or more of the following: (i) one-time PIN (OTP) code, (ii) login ID and password, and (iii) biometric data, and wherein the digital content is configured with the sensor responsive element in response to the confirming that the source is an authorized user of the communication or computer system.

4. The method of claim 2, further comprising:

initiating a transaction for at least the user of the communication or computer system;

receiving indication that the transaction has been completed; and generating a transaction confirmation message, wherein the transaction confirmation message is the identified digital content.

5. The method of claim 2, further comprising:

receiving the digital content from the authorized user;

determining whether the digital content includes an identifier or a configuration, the identifier being a tag indicating a request to configure the digital content with the sensor responsive element and the configuration being one or more parameters associated with the sensor responsive element; and determining whether the tag is valid by verifying that a tag limit has not been exceeded for the authorized user or determining whether the one or more parameters have been satisfied, wherein the tag limit is a predefined number of tags allotted for the authorized user.

6. The method of claim 1, further comprising:

assigning a first identifier to the generated sensor responsive element; and associating or linking the generated sensor responsive element with the digital content via a second identifier, the first or second identifier being an alphanumeric string of characters or information associated with or derived from the digital content.

7. The method of claim 1, wherein determining whether the source of the digital content is authenticated or verified further comprises:

determining whether the source is an entity external to the communication or computer system;

in response to the source being external to the communication or computer system, determining that the source is not an authorized user of the communication or computer system; and determining whether authenticity of the digital content is verifiable by at least determining whether the source is identifiable or trustable based on information associated with the digital content.

8. The method of claim 1, wherein the client device includes at least one sensor configured to generate the sensor data, the at least one sensor comprising a gyroscope or an accelerometer.

9. At least one non-transitory computer-readable storage medium comprising instructions that, when executed, cause at least one processor to:

identify digital content to be sent to a client device associated with a user of a communication or computer system;

determine whether a source of the digital content is authenticated or verified;

in response to the determination that the source of the digital content is authenticated or verified, generate a sensor responsive element, wherein the sensor responsive element comprises a visual interface that dynamically responds to sensor data generated by one or more sensors of the client device associated with the user, wherein the sensor data comprises movement data, and the sensor response element to allow a first portion of the visual interface to move relative to a second portion of the visual interface in response to the movement data;

configure the digital content with the sensor responsive element; and send the digital content with the configured sensor responsive element to the client device associated with the user.

10. The medium of claim 9, wherein the determination of whether the source of the digital content is authenticated or verified comprises instructions that further cause the at least one processor to:

determine whether the source is an authorized user of the communication or computer system by at least receiving credential input from the source and determining whether the credential input matches the source; and in response to the determination that the credential input matches the source, confirm that the source of the digital content is an authorized user.

11. The medium of claim 10, wherein the credential input comprises one or more of the following: (i) one-time PIN (OTP) code, (ii) login ID and password, and (iii) biometric data, and wherein the digital content is configured with the sensor responsive element in response to the confirmation that the source is an authorized user of the communication or computer system.

12. The medium of claim 10, wherein the instructions further cause the at least one processor to:

initiate a transaction for at least the user of the communication or computer system;

receive indication that the transaction has been completed; and generate a transaction confirmation message, wherein the transaction confirmation message is the identified digital content.

13. The medium of claim 10, wherein the instructions further cause the at least one processor to:

receive the digital content from the authorized user;

determine whether the digital content includes an identifier or a configuration, the identifier being a tag indicating a request to configure the digital content with the sensor responsive element and the configuration being one or more parameters associated with the sensor responsive element; and determine whether the tag is valid by verifying that a tag limit has not been exceeded for the authorized user or determine whether the one or more parameters have been satisfied, wherein the tag limit is a predefined number of tags allotted for the authorized user.

14. The medium of claim 9, wherein the determination of whether the source of the digital content is authenticated or verified comprises instructions that further cause the at least one processor to:

determine whether the source is an entity external to the communication or computer system;

in response to the source being external to the communication or computer system, determine that the source is not an authorized user of the communication or computer system; and determine whether authenticity of the digital content is verifiable by at least determining whether the source is identifiable or trustable based on information associated with the digital content.

15. The medium of claim 9, wherein the client device includes at least one sensor configured to generate the sensor data, the at least one sensor comprising a gyroscope or an accelerometer.

16. An apparatus comprising:

memory; and at least one processor operable to execute stored instructions that, when executed, causes the at least one processor to:

identify digital content to be sent to a client device associated with a user of a communication or computer system;

determine whether a source of the digital content is authenticated or verified;

in response to the determination that the source of the digital content is authenticated or verified, generate a sensor responsive element, wherein the sensor responsive element comprises a visual interface that dynamically responds to sensor data generated by one or more sensors of the client device associated with the user, wherein the sensor data comprises movement data, and the sensor response element to allow a first portion of the visual interface to move relative to a second portion of the visual interface in response to the movement data;

configure the digital content with the sensor responsive element; and send the digital content with the configured sensor responsive element to the client device associated with the user.

17. The apparatus of claim 16, wherein the determination of whether the source of the digital content is authenticated or verified comprises the at least one processor further caused to:

determine whether the source is an authorized user of the communication or computer system by at least receiving credential input from the source and determining whether the credential input matches the source; and in response to the determination that the credential input matches the source, confirm that the source of the digital content is an authorized user.

18. The apparatus of claim 17, wherein the credential input comprises one or more of the following: (i) one-time PIN (OTP) code, (ii) login ID and password, and (iii) biometric data, and wherein the digital content is configured with the sensor responsive element in response to the confirmation that the source is an authorized user of the communication or computer system.

19. The apparatus of claim 16, wherein the determination of whether the source of the digital content is authenticated or verified comprises the at least one processor further caused to:

determine whether the source is an entity external to the communication or computer system;

in response to the source being external to the communication or computer system, determine that the source is not an authorized user of the communication or computer system; and determine whether authenticity of the digital content is verifiable by at least determining whether the source is identifiable or trustable based on information associated with the digital content.

20. The apparatus of claim 16, wherein the client device includes at least one sensor configured to generate the sensor data, the at least one sensor comprising a gyroscope or an accelerometer.

* * * * *